(12) United States Patent
Chesney et al.

(10) Patent No.: US 12,013,781 B2
(45) Date of Patent: Jun. 18, 2024

(54) PROCESSING DEVICE USING VARIABLE STRIDE PATTERN

(71) Applicant: Graphcore Limited, Bristol (GB)

(72) Inventors: Sam Chesney, Bristol (GB); Alan Graham Alexander, Wotton-Under-Edge (GB); Richard Luke Southwell Osborne, Bristol (GB); Edward Andrews, Bristol (GB)

(73) Assignee: Graphcore Limited, Bristol (GB)

( * ) Notice: Subject to any disclaimer, the term of this patent is extended or adjusted under 35 U.S.C. 154(b) by 15 days.

(21) Appl. No.: 17/653,012

(22) Filed: Mar. 1, 2022

(65) Prior Publication Data
US 2023/0084298 A1    Mar. 16, 2023

(30) Foreign Application Priority Data
Sep. 8, 2021   (GB) ..................................... 2112803

(51) Int. Cl.
*G06F 12/0804*  (2016.01)
*G06F 9/30*  (2018.01)

(52) U.S. Cl.
CPC ...... *G06F 12/0804* (2013.01); *G06F 9/30098* (2013.01); *G06F 2212/6026* (2013.01)

(58) Field of Classification Search
CPC ............. G06F 12/0804; G06F 9/30098; G06F 2212/6026
See application file for complete search history.

(56) References Cited

U.S. PATENT DOCUMENTS

| | | | |
|---|---|---|---|
| 6,332,186 B1 | 12/2001 | Elwood | |
| 6,463,069 B1 * | 10/2002 | Eriksson | H04B 1/74 370/428 |
| 7,346,741 B1 | 3/2008 | Keish et al. | |
| 7,487,296 B1 * | 2/2009 | Iacobovici | G06F 9/383 712/207 |
| 7,533,242 B1 | 5/2009 | Moll | |
| 9,311,247 B1 | 4/2016 | Schuttenberg | |
| 2005/0038978 A1 | 2/2005 | Nickolls | |
| 2014/0189249 A1 | 7/2014 | Ye | |
| 2015/0121014 A1 | 4/2015 | Dasika et al. | |

(Continued)

OTHER PUBLICATIONS

International Search Report and Written Opinion dated Jul. 7, 2022 for Application No. PCT/EP2022/055105. 16 pages.

*Primary Examiner* — Prasith Thammavong
(74) *Attorney, Agent, or Firm* — Haynes and Boone, LLP

(57) ABSTRACT

For certain applications, parts of the application data held in memory of a processing device (e.g. that are produced as a result of operations performed by the execution unit) are arranged in regular repeating patterns in the memory, and therefore, the execution unit may set up a suitable striding pattern for use by a send engine. The send engine accesses the memory at locations in accordance with the configured striding pattern so as to access a plurality of items of data that are arranged together in a regular pattern. In a similar manner as done for sends, the execution may set up a striding pattern for use by a receive engine. The receive engine, upon receiving a plurality of items of data, causes those items of data to be stored at locations in the memory, as determined in accordance with the configured striding pattern.

19 Claims, 23 Drawing Sheets

(56) References Cited

U.S. PATENT DOCUMENTS

| | | | |
|---|---|---|---|
| 2015/0143058 A1* | 5/2015 | Kole | G06F 12/0862 |
| | | | 711/137 |
| 2015/0356015 A1 | 12/2015 | Sathish | |
| 2017/0091147 A1 | 3/2017 | Mathew et al. | |
| 2017/0132140 A1 | 5/2017 | Lin et al. | |
| 2017/0168946 A1 | 6/2017 | Wang | |
| 2018/0246718 A1* | 8/2018 | Lin | G06F 12/0862 |
| 2018/0246722 A1 | 8/2018 | Plotnikov et al. | |
| 2020/0004699 A1 | 1/2020 | Mishra et al. | |
| 2020/0210187 A1 | 7/2020 | Alexander | |
| 2020/0233670 A1 | 7/2020 | Alexander et al. | |

* cited by examiner

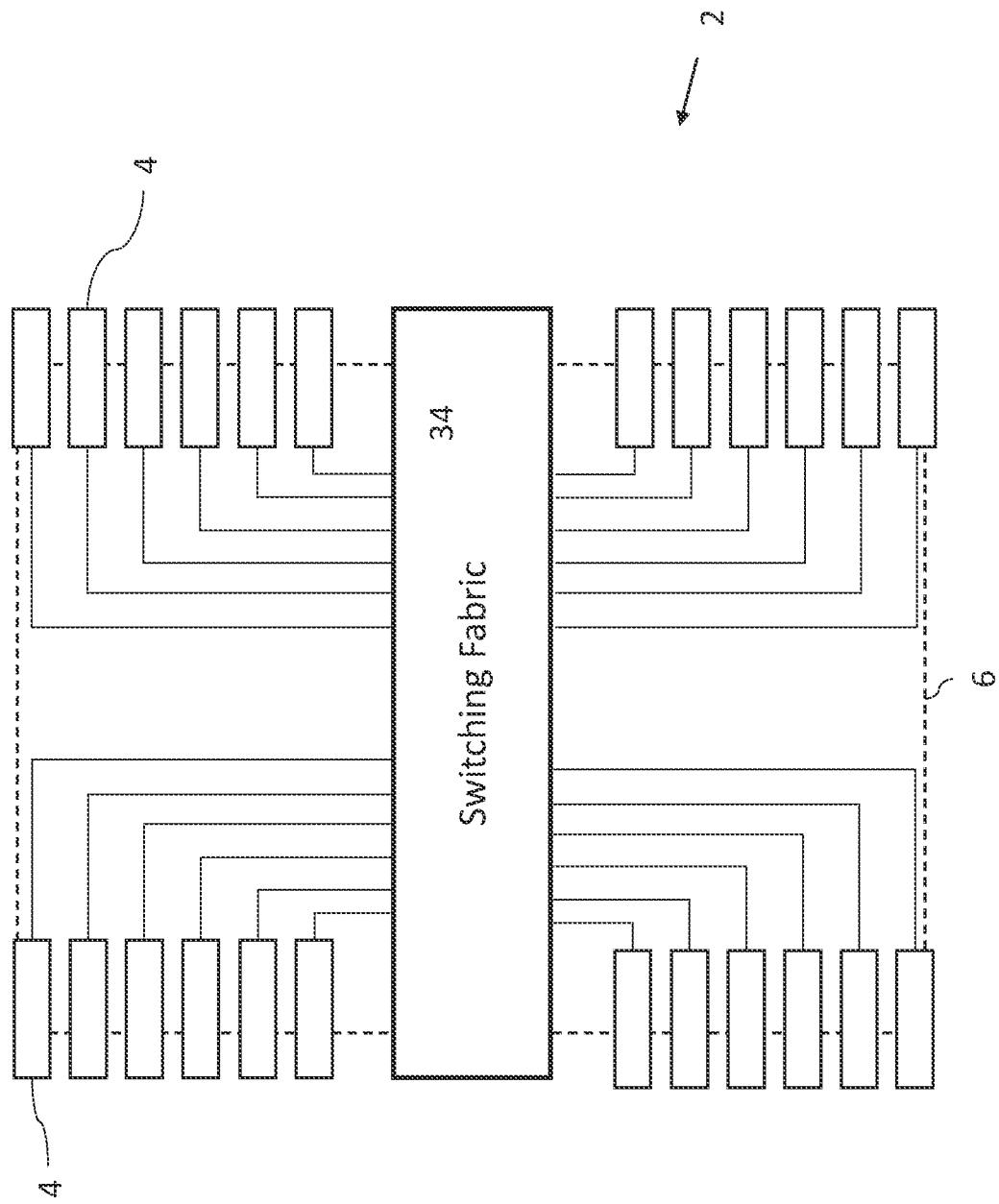

PROCESSING DEVICE USING VARIABLE STRIDE PATTERN

CROSS-REFERENCE TO RELATED APPLICATIONS

The present application claims priority to United Kingdom Patent Application No. GB2112803.8, filed Sep. 8, 2021, the disclosure of which is hereby incorporated herein by reference in its entirety.

TECHNICAL FIELD

The present application relates to a processing device comprising a memory and, in particular, to a processing device configured to send and receive data to and from identified locations in its memory.

BACKGROUND

A processing device may comprise an execution unit and a memory. The execution unit is capable of executing one or more program threads in order to perform operations on data loaded from the memory to generate results, which are then stored in the memory. The results may be subject to subsequent processing by the execution unit or may be dispatched from the processing device.

In order to increase processing capacity available for running applications, a plurality of processing devices may be connected together, and configured to perform multiple different types of operations in parallel with one another before exchanging their results. An example of a context in which such a parallel processing architecture is useful may be found in machine intelligence. As will be familiar to those skilled in the art of machine intelligence, a machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

In such machine learning applications, the implementation of each node will involve the processing of data, and the interconnections of the graph correspond to data to be exchanged between the nodes. Typically, at least some of the processing of each node can be carried out independently of some or all others of the nodes in the graph, and therefore large graphs expose great opportunities for parallelism.

When executing an application involving multiple processing devices, there is typically a need to exchange data between these devices. When sending data, a processing device must include the capability to identify where in its memory each item of data that is to be sent is stored. Furthermore, when receiving data, a processing device must include the capability to identify in its memory, where each received item of data is to be stored.

SUMMARY

To enable a processing device to identify locations in memory for the sending or storage of data, the memory addresses may be identified explicitly in a compiled code set that is stored in the processing device. However, storing each and every memory address explicitly in an instruction memory of the processing device may require a significant amount of the storage space in the instruction memory. It would be desirable to find a way of reducing the amount of storage space required, whilst still enabling the memory addresses for the sending and storage of data to be identified.

According to a first aspect, there is provided a processing device comprising: a memory; an execution unit configured to execute a send instruction to send data; a send engine comprising: one or more registers for storing one or more configuration values defining a variable stride pattern for updating a pointer to an address at which the memory is to be accessed for sending the data; and processing circuitry configured to, in response to execution of one or more instances of the send instruction by the execution unit: cause a plurality of items of data at locations in the memory identified by the pointer to be sent to at least one destination external to the processing device; and between each send of one of the plurality of items of data, update the pointer in accordance with the variable stride pattern, wherein the execution unit is configured to execute at least one instruction to update the variable stride pattern used by the send engine, wherein updating the variable stride pattern comprises updating at least one of the one or more configuration values for use by the send engine in performing one or more subsequent sends in response to a further instance of the send instruction executed by the execution unit.

The inventors have recognised that, for certain applications, parts of the application data held in memory of a processing device (e.g., that are produced as a result of operations performed by the execution unit) are arranged in regular repeating patterns in the memory, and therefore, the execution unit may set up a suitable striding pattern for use by a send engine. The send engine accesses the memory at locations in accordance with the configured striding pattern so as to access a plurality of items of data that are arranged together in a regular pattern. The send engine is thus able to send data from the appropriate locations in memory without requiring the execution unit to provide it with an explicit address value for each and every item of data to be sent from the processing device. In this way, embodiments provide a way by which the code for sending data may be reduced in size.

In some embodiments, the at least one instruction comprises an instruction having a combined send and update functionality, which when executed by the execution unit causes both: new values for the at least one of the one or more configuration values to be provided to the send engine for use by the send engine in performing the one or more subsequent sends; and sending of a further item of data from the memory.

In some embodiments, the at least one instruction, when executed by the execution unit, causes new values for the at least one of the one or more of the configuration values to be copied to part of the one or more registers whilst the send engine continues to update the pointer using former values for the at least one of the one or more configuration values.

In some embodiments, the execution unit is configured to, following the copying of the new values to the part of the one or more registers, cause the new values to replace the former values for use by the send engine.

In some embodiments, the at least one of the one or more configuration values include at least one of: a stride size value defining a separation in the memory between two of the items of data to be sent consecutively by the send engine; and a repeat value defining a number of times a stride of a particular size is to be applied by the send engine before applying a stride of a different size.

In some embodiments, the memory is configured to store a compiled code set comprising the one or more instances of the send instruction and one or more instances of the at least one instruction for updating the variable stride pattern, wherein the compiled code set is arranged such that each of the one or more instances of the send instruction is executed during an allocated clock cycle that is a predefined number of processor clock cycles following receipt of a synchronisation signal, wherein the compiled code set is arranged such that each of the one or more instances of the at least one instruction for updating the variable stride pattern is executed during an allocated clock cycle that is a predefined number of processor clock cycles following receipt of the synchronisation signal.

In some embodiments, the processing device comprises wiring configured to transport further data from the memory along a loopback path to be stored back in the memory, wherein the processing circuitry of the send engine is configured to, in response to execution of an additional one or more instances of the send instruction by the execution unit: cause a plurality of items of the further data to be re-arranged in the memory by sending the plurality of items of the further data via the loopback path in an order determined by a current variable stride pattern active for the send engine.

According to a second aspect, there is provided a processing device comprising: a memory; an execution unit; and a receive engine comprising: one or more registers for storing one or more configuration values defining a variable stride pattern for updating a pointer to an address at which the memory is accessed for storing data received at the processing device; and processing circuitry configured to, in response to receipt of a plurality of items of data at the processing device: cause the plurality of items of data to be stored at locations in the memory identified by the pointer; and for each receipt and storage of one of the plurality of items of data, update the pointer in accordance with the variable stride pattern, wherein the execution unit is configured to execute at least one instruction to update the variable stride pattern used by the receive engine, wherein updating the variable stride pattern comprises updating at least one of the one or more configuration values such that new values for the at least one of the one or more configuration are used by the receive engine for storing one or more further items of data received at the processing device.

In a similar manner as done for sends, the execution may set up a striding pattern for use by a receive engine. The receive engine, upon receiving a plurality of items of data, causes those items of data to be stored at locations in the memory, as determined in accordance with the configured striding pattern. The items of data may be stored in a regular repeating pattern that is suitable for use by the execution unit for performing operations on the received data. The receive engine is able to use the configured striding pattern to store received data to the appropriate locations in memory without requiring the execution unit to provide it with an explicit address value for each and every item of data received at the processing device. In this way, embodiments provide a way by which the size of the code for storing received data may be reduced in size.

The first aspect and the second aspect represent closely related alternative solutions to the same technical problem.

In some embodiments, the at least one instruction comprises an instruction having a combined send and update functionality, which when executed by the execution unit causes both: the new values for the at least one of the one or more of the configuration values to be provided to the receive engine for use by the receive engine in storing the one or more further items of data; and sending of an outgoing item of data from the memory.

In some embodiments, the at least one instruction, when executed by the execution unit, causes the new values for the at least one of the one or more configuration values to be copied to part of the one or more registers whilst the receive engine continues to update the pointer using former values for the at least one of the one or more configuration values.

In some embodiments, the execution unit is configured to, following the copying of the new values to the part of the one or more registers, cause the new values to replace the former values for use by the receive engine.

In some embodiments, the at least one of the one or more configuration values include at least one of: a stride size value defining a separation in the memory between locations in the memory to which data items are stored consecutively by the receive engine; and a repeat value defining a number of times a stride of a particular size is to be applied by the receive engine before applying a stride of a different size.

In some embodiments, the processing device comprises wiring configured to transport further data from the memory along a loopback path to be stored back in the memory, wherein the processing circuitry of the receive engine is configured to, cause a plurality of items of the further data to be re-arranged in the memory by, in response to receipt of the plurality of items of the further data via the loopback path: storing the plurality of items of the further data in an arrangement dependent upon a current variable stride patterns active for the receive engine.

In some embodiments, the memory is configured to store a compiled code set comprising one or more instances of the at least one instruction for updating the variable stride pattern, wherein the compiled code set is arranged such that each of the one or more instances of the at least one instruction is executed by the execution unit during an allocated clock cycle that is a predefined number of processor clock cycles following receipt of a synchronisation signal at the processing device.

In some embodiments, the at least one of the one or more configuration values includes a plurality of configuration values.

In some embodiments, the execution unit is configured to, upon executing the at least one instruction, update a bit string held in a configuration register of the processing device, wherein the bit string held in the configuration register is divided into a plurality of subsets of bits each of which is mapped to one of the plurality of configuration values such that the processing circuitry is configured to: use updated values for those ones of the plurality of configuration values to which the subsets are mapped in response to the write of the bit string to the configuration register.

In some embodiments, each of the plurality of subsets of bits is shorter in length than its associated one of the plurality of configuration values to which it is mapped.

In some embodiments, the plurality of configuration values comprise a plurality of stride size values.

In some embodiments, the plurality of configuration values comprises a plurality of repeat values, each of which is associated with one of the stride size values and specifies how many times its associated one of the stride size values is to be applied before the processing circuitry applies a different one of the stride size values.

In some embodiments, the one or more registers are control and status registers belonging to a thread running on the execution unit.

According to a third aspect, there is provided a multi-tile processing unit comprising a plurality of instances of the processing device according to the first aspect or the second aspect, wherein each of the plurality of instances of the processing device is a tile.

According to a fourth aspect, there is provided a method for sending data from a processing device, the method comprising: storing one or more configuration values defining a variable stride pattern for updating a pointer to an address at which a memory is to be accessed for sending data; and in response to execution of one or more instances of a send instruction: cause a plurality of items of data at locations in the memory identified by the pointer to be sent to at least one destination external to the processing device; and between each send of one of the plurality of items of data, update the pointer in accordance with the variable stride pattern, wherein the method further comprises executing at least one instruction to update the variable stride pattern, wherein updating the variable stride pattern comprises updating at least one of the one or more configuration values for use in performing one or more subsequent sends in response to execution of a further instance of the send instruction.

In some embodiments, the at least one instruction comprises an instruction having a combined send and update functionality, wherein the method comprises executing the instruction having the combined send and update functionality to cause both: new values for the at least one of the one or more configuration values to be provided to the send engine for use by the send engine in performing the one or more subsequent sends; and sending of a further item of data from the memory.

In some embodiments, wherein the at least one instruction, when executed by the execution unit, causes new values for the at least one of the one or more of the configuration values to be copied to part of the one or more registers whilst the send engine continues to update the pointer using former values for the at least one of the one or more configuration values.

In some embodiments, the method comprises, following the copying of the new values to the part of the one or more registers, causing the new values to replace the former values for use by the send engine.

In some embodiments, the at least one of the one or more configuration values include at least one of: a stride size value defining a separation in the memory between two of the items of data to be sent consecutively; and a repeat value defining a number of times a stride of a particular size is to be applied before applying a stride of a different size.

In some embodiments, the memory is configured to store a compiled code set comprising the one or more instances of the send instruction and one or more instances of the at least one instruction for updating the variable stride pattern, wherein the method comprises: executing each of the one or more instances of the send instruction during an allocated clock cycle that is a predefined number of processor clock cycles following receipt of a synchronisation signal; and executing each of the one or more instances of the at least one instruction for updating the variable stride pattern during an allocated clock cycle that is a predefined number of processor clock cycles following receipt of the synchronisation signal.

In some embodiments, the method comprises: in response to execution of an additional one or more instances of the send instruction by the execution unit: cause a plurality of items of further data to be re-arranged in the memory by sending the plurality of items of the further data via a loopback path to be stored back in the memory in an order determined by a current variable stride pattern active for the send engine.

According to a fifth aspect, there is provided a method for storing data received at a processing device, the method comprising: storing one or more configuration values defining a variable stride pattern for updating a pointer to an address at which the memory is accessed for storing data received at the processing device; and in response to receipt of a plurality of items of data at the processing device: cause the plurality of items of data to be stored at locations in the memory identified by the pointer; and for each receipt and storage of one of the plurality of items of data, update the pointer in accordance with the variable stride pattern, wherein the method further comprises executing at least one instruction to update the variable stride pattern, wherein updating the variable stride pattern comprises updating at least one of the one or more configuration values such that new values for the at least one of the one or more configuration are used for storing one or more further items of data received at the processing device.

In some embodiments, the at least one instruction comprises an instruction having a combined send and update functionality, wherein the method comprises executing the instruction having the combined send and update functionality to cause both: the new values for the at least one of the one or more of the configuration values to be provided to the receive engine for use by the receive engine in storing the one or more further items of data; and sending of an outgoing item of data from the memory.

In some embodiments, the at least one instruction, when executed by the execution unit, causes the new values for the at least one of the one or more configuration values to be copied to part of the one or more registers whilst the receive engine continues to update the pointer using former values for the at least one of the one or more configuration values.

In some embodiments, the method comprises: following the copying of the new values to the part of the one or more registers, causing the new values to replace the former values for use by the receive engine.

In some embodiments, the at least one of the one or more configuration values include at least one of: a stride size value defining a separation in the memory between locations in the memory to which data items are stored consecutively by the receive engine; and a repeat value defining a number of times a stride of a particular size is to be applied by the receive engine before applying a stride of a different size.

In some embodiments, the method comprises causing a plurality of items of further data to be re-arranged in the memory by, in response to receipt of the plurality of items of the further data via a loopback path of the processing device: storing the plurality of items of the further data in an arrangement dependent upon a current variable stride patterns active for the receive engine.

In some embodiments, the memory is configured to store a compiled code set comprising one or more instances of the at least one instruction for updating the variable stride pattern, wherein the method comprises executing the compiled code set such that each of the one or more instances of the at least one instruction is executed during an allocated clock cycle that is a predefined number of processor clock cycles following receipt of a synchronisation signal at the processing device.

In some embodiments, the at least one of the one or more configuration values includes a plurality of configuration values.

In some embodiments, the method comprises, upon executing the at least one instruction, updating a bit string held in a configuration register of the processing device, wherein the bit string held in the configuration register is divided into a plurality of subsets of bits each of which is mapped to one of the plurality of configuration values such that the processing circuitry is configured to: use updated values for those ones of the plurality of configuration values to which the subsets are mapped in response to the write of the bit string to the configuration register.

In some embodiments, each of the plurality of subsets of bits is shorter in length than its associated one of the plurality of configuration values to which it is mapped.

In some embodiments, the plurality of configuration values comprise a plurality of stride size values.

In some embodiments, the plurality of configuration values comprises a plurality of repeat values, each of which is associated with one of the stride size values and specifies how many times its associated one of the stride size values is to be applied before the processing circuitry applies a different one of the stride size values.

In some embodiments, the one or more registers are control and status registers belonging to a thread running on the execution unit.

According to a sixth aspect, there is provided a computer program comprising computer readable instructions, which when executed by at least processor cause a method according to the fourth or fifth aspect and any embodiment therefor to be performed.

According to a seventh aspect, there is provided a non-transitory computer readable medium comprising the computer program according to the sixth aspect.

BRIEF DESCRIPTION OF DRAWINGS

For a better understanding of the present disclosure and to show how the same may be carried into effect, reference will now be made by way of example to the accompanying Figures in which:

FIG. 11A is a schematic illustration of a processing unit comprising a plurality of tiles;

DETAILED DESCRIPTION

Figure 1:
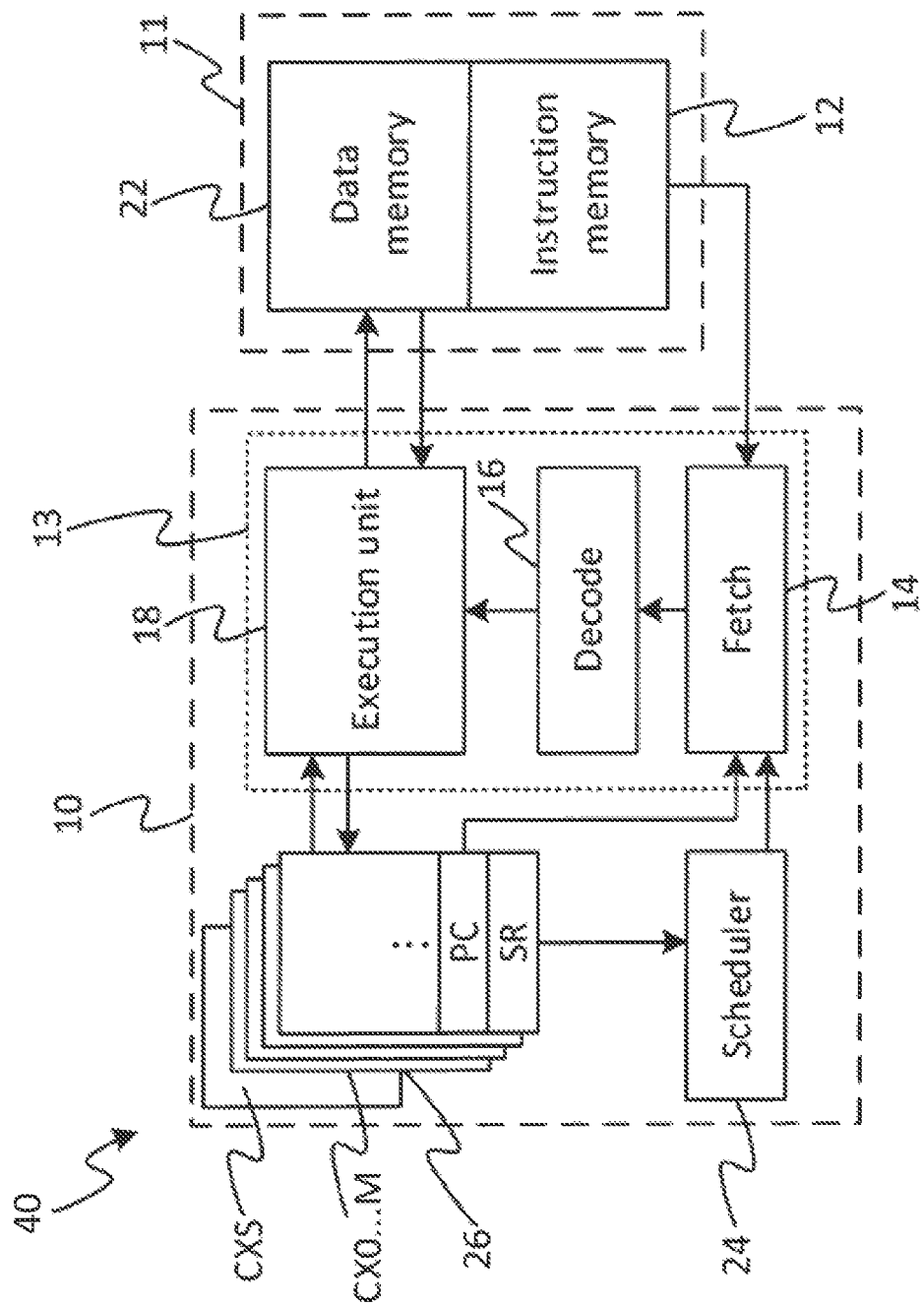
FIG. 1 is a schematic block diagram of a processing device.

FIG. 1 illustrates an example of a processing device 40 in accordance with embodiments of the present disclosure. The processing device 40 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory units or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processing unit's instruction set, consisting of a single opcode and zero or more operands.

The program stored in memory 12 comprises a plurality of worker threads, and a supervisor subprogram which may be structured as one or more supervisor threads. In embodiments, each of some or all of the worker threads takes the form of a respective "codelet".

Within the processing unit 10, multiple different ones of the threads from the instruction memory 12 can be interleaved through a single execution pipeline 13 (though typically only a subset of the total threads stored in the instruction memory can be interleaved at any given point in the overall program). The multi-threaded processing unit 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processing unit 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

Figure 2:
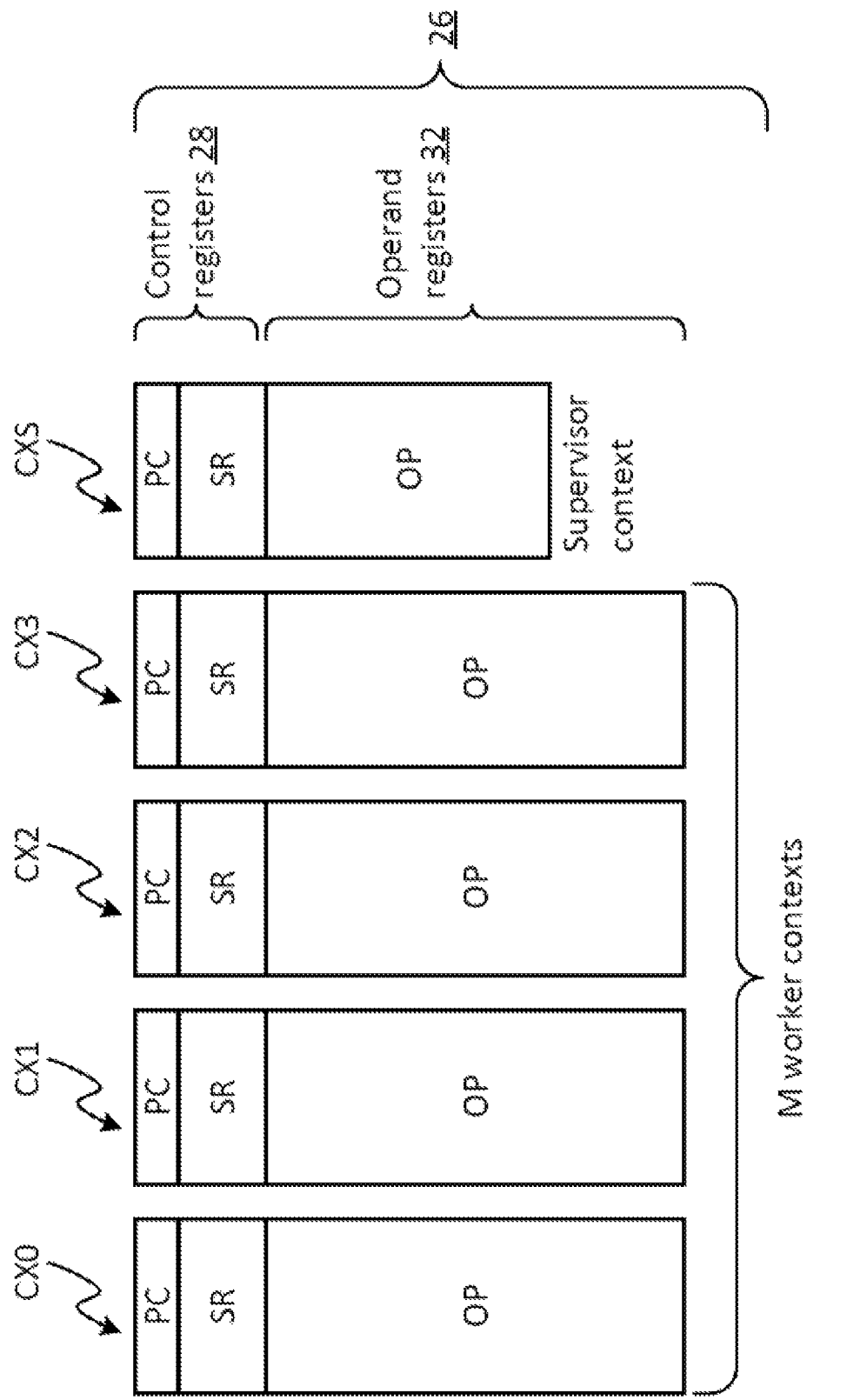
FIG. 2 is a schematic block diagram of a plurality of thread contexts.

An example of the registers making up each of the context register files 26 is illustrated schematically in FIG. 2. Each of the context register files 26 comprises a respective one or more control registers 28, comprising at least a program counter (PC) for the respective thread (for keeping track of the instruction address at which the thread is currently executing), and in embodiments also a set of one or more status registers (SR) recording a current status of the respective thread (such as whether it is currently running or paused, e.g. because it has encountered an error). Each of the context register files 26 also comprises a respective set of operand registers (OP) 32, for temporarily holding operands of the instructions executed by the respective thread, i.e. values operated upon or resulting from operations defined by the opcodes of the respective thread's instructions when executed. It will be appreciated that each of the context register files 26 may optionally comprise a respective one or more other types of register (not shown). Note also that whilst the term "register file" is sometimes used to refer to a group of registers in a common address space, this does not necessarily have to be the case in the present disclosure and each of the hardware contexts 26 (each of the register sets 26 representing each context) may more generally comprise one or multiple such register files.

In embodiments, the arrangement comprises one worker context register file CX0 . . . CX(M-1) for each of the number M of threads that can be executed concurrently (M=3 in the example illustrated but this is not limiting), and one additional supervisor context register file CXS. The worker context register files are reserved for storing the contexts of worker threads, and the supervisor context register file is reserved for storing the context of a supervisor thread. Note that in embodiments the supervisor context is special, in that it has a different number of registers than each of the workers. Each of the worker contexts preferably have the same number of status registers and operand registers as one another. In embodiments, the supervisor context may have fewer operand registers than each of the workers. Examples of operand registers the worker context may have that the supervisor does not include: floating point registers, accumulate registers, and/or dedicated weight registers (for holding weights of a neural network). In embodiments, the supervisor may also have a different number of status registers. Further, in embodiments the instruction set architecture of the processing device 40 may be configured such that the worker threads and supervisor thread(s) execute some different types of instruction, but also share some instruction types.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots. For example the scheduling scheme could be round-robin or weighted round-robin. Another term for a processor operating in such a manner is a barrel threaded processor.

In some embodiments, the scheduler 24 may have access to one of the status registers SR of each thread indicating whether the thread is paused, so that the scheduler 24 in fact controls the fetch stage 14 to fetch the instructions of only those of the threads that are currently active. In embodiments, preferably each time slot (and corresponding context register file) is always owned by one thread or another, i.e. each slot is always occupied by some thread, and each slot is always included in the sequence of the scheduler 24; though the thread occupying any given slot may happen to be paused at the time, in which case when the sequence comes around to that slot, the instruction fetch for the respective thread is passed over. Alternatively it is not excluded for example that in alternative, less preferred implementations, some slots can be temporarily vacant and excluded from the scheduled sequence. Where reference is made to the number of time slots the execution unit is operable to interleave, or such like, this refers to the maximum number of slots the execution unit is capable of executing concurrently, i.e. the number of concurrent slots the execution unit's hardware supports.

The fetch stage 14 has access to the program counter (PC) of each of the contexts. For each respective thread, the fetch stage 14 fetches the next instruction of that thread from the next address in the program memory 12 as indicated by the program counter. The program counter increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers 32 specified in the instruction, in order for the instruction to be executed. The execution unit 18 has access to the operand registers 32 and the control registers 28, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction. Or if the instruction defines a branch or a status change, the execution unit changes value in the program counter PC or one of the status registers SR accordingly. Note that while one thread's instruction is being executed by the execution unit 18, an instruction from the thread in the next time slot in the interleaved sequence can be being decoded by the decode stage 16; and/or while one instruction is being decoded by the decode stage 16, the instruction from the thread in the next time slot after that can be being fetched by the fetch stage 14 (though in general the scope of the disclosure is not limited to one instruction per time slot, e.g. in alternative scenarios a batch of two or more instructions could be issued from a given thread per time slot). Thus the interleaving advantageously hides latency in the pipeline 13, in accordance with known barrel threaded processing techniques.

Figure 3:
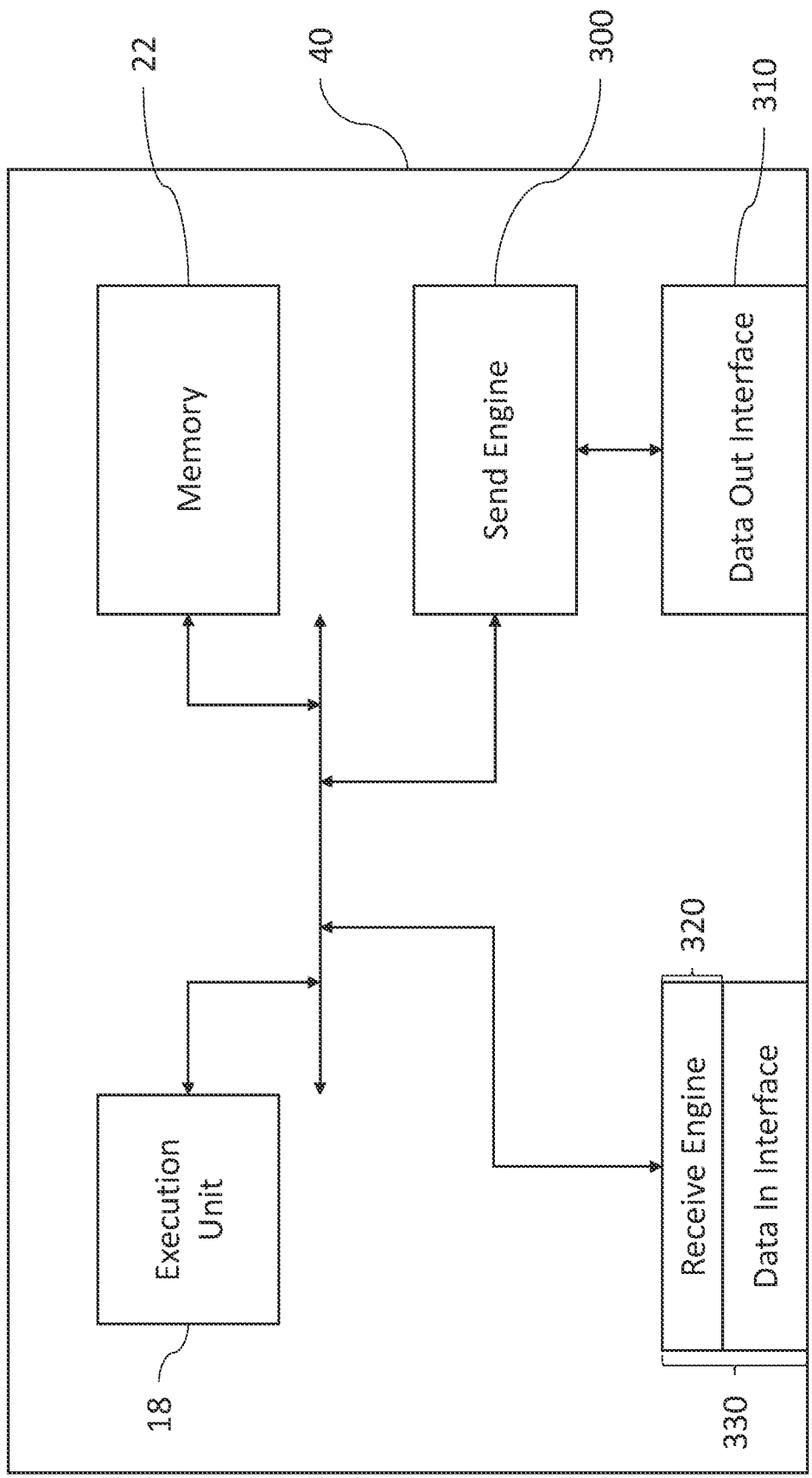
FIG. 3 is a further schematic block diagram of the processing device.

Reference is made to FIG. 3, which shows a further illustration of the processing device 40. The processing device 40 includes an execution unit 18 and a data memory 22 as previously described. FIG. 3 additionally shows a send engine 300 and a receive engine 320 of the processing device 40. The send engine 300 and the receive engine 320 are configured to implement send and receive operations in accordance with stride patterns stored as part of a compiled code set held in the instruction memory 12.

The send engine 300 is configured to send items of data from the memory 22 under the control of the execution unit 18. The send engine 300 is responsive to SEND instructions executed by the execution unit 18, which cause the send engine 300 to send data items from the memory 22 to a destination external to the processing device 40. The send engine 300 maintains a read pointer identifying the location in memory 22 of the next item of data to be sent. The send engine 300 updates the read pointer between the sending of each item of data. In response to the execution of a SEND instruction by the execution unit 18, the send engine 300 causes one or more items of data to be sent over the data out interface 310 of the processing device 40. Each of these items of data that are sent in response to execution of the SEND instruction are identified by the read pointer, with the read pointer being updated between the sending of each of the items. For example, when the SEND instruction is executed by the execution unit 18 to send two items of data, the send engine 300 accesses the first of these items at a location in memory 22 identified by the read pointer and sends this first item of data over the data out interface 310. Following the sending of that first item of data, the send engine 300 updates the read pointer to point to the second item of data. The send engine 300 then causes the second item of data to be sent (over the data out interface 310) from the new location in memory 22 identified by the read pointer.

The updating of the read pointer between sending items of data is performed in accordance with a variable stride pattern stored in the send engine 300. The variable stride pattern stored by the send engine 300 is referred to herein as the outgoing stride pattern. The outgoing stride pattern comprises one or more configuration values, which are referred to herein as the outgoing configuration values. The outgoing configuration values specify the striding behaviour (i.e. how the read pointer is updated) of the send engine 300. The outgoing stride pattern is configurable by the execution unit 18. The execution unit 18 is configured to execute one or more instructions to update the outgoing configuration values representing the outgoing stride pattern used by the send engine 300. The execution unit 18 may update the configuration values such that the sending of a first set of data items, performed by the send engine 300 prior to the update, are performed using a first variable stride pattern, represented by a first set of one or more configuration values, whilst the sending of a second set of data items, performed by the send engine 300 after the update, are performed using a second variable stride pattern, represented by a second set of one or more configuration values.

The execution unit 18 is, therefore, able to set up a variable stride pattern when a set of data that is to be sent is arranged in the memory 22 in a regular repeating pattern. By doing so, the execution unit 18 is able to cause the sending of the set of data without needing to specify an address each time an item of that data that is arranged non-contiguously to the previously sent item of data is to be sent by the send engine 300. This enables a reduction of the code size stored in the instruction memory 12.

In embodiments, the execution unit 18 is configured to execute different types of SEND instruction in order to cause data to be sent by the send engine 300.

Figure 9A:
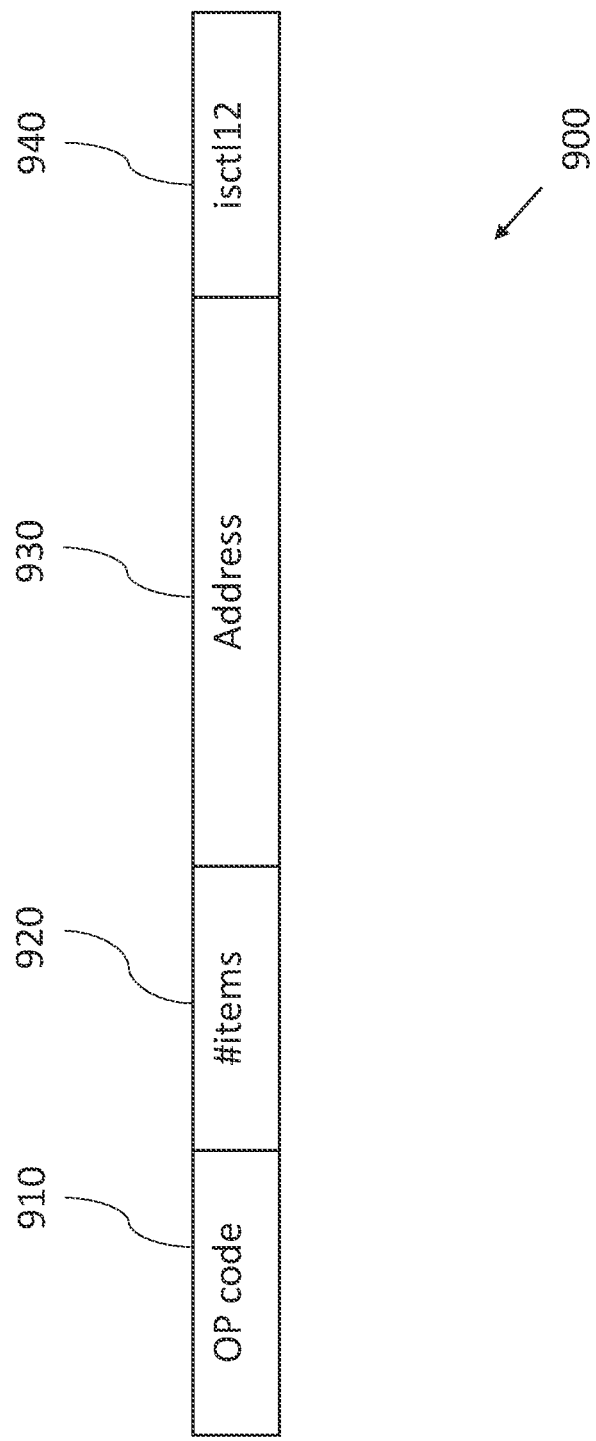
FIG. 9A is an illustration of the fields of a first example send instruction.

Reference is made to FIG. 9A, which illustrates an example of fields of a first type of SEND instruction 900 that may be executed by the execution 18 to cause sends to be performed. The SEND instruction 900 includes an op code 910, which identifies the instruction 900 as being a first type of SEND instruction. The SEND instruction 900 specifies a number of items of data 920 to be sent from the memory 22 upon execution of the instruction. The SEND instruction 900 includes an address field 930, allowing the address in memory 22 from which data is to be sent to be specified. Execution of the instruction 900 causes the number of items of data specified by field 920 to be sent starting from the address specified by field 930. Specifically, the first item of data sent in response to the instruction is sent from the address specified by field 930, with the remaining items of data being sent from addresses determined by applying the outgoing stride pattern starting from the address specified by field 930. The field 940 is an optional field, which specifies one or more directions in which data is to be sent from the processing device 40. This field 940 may be referred to as east/west indicator, and is described in more detail in application Ser. No. 15/886,315, which is incorporated by reference.

Figure 9B:
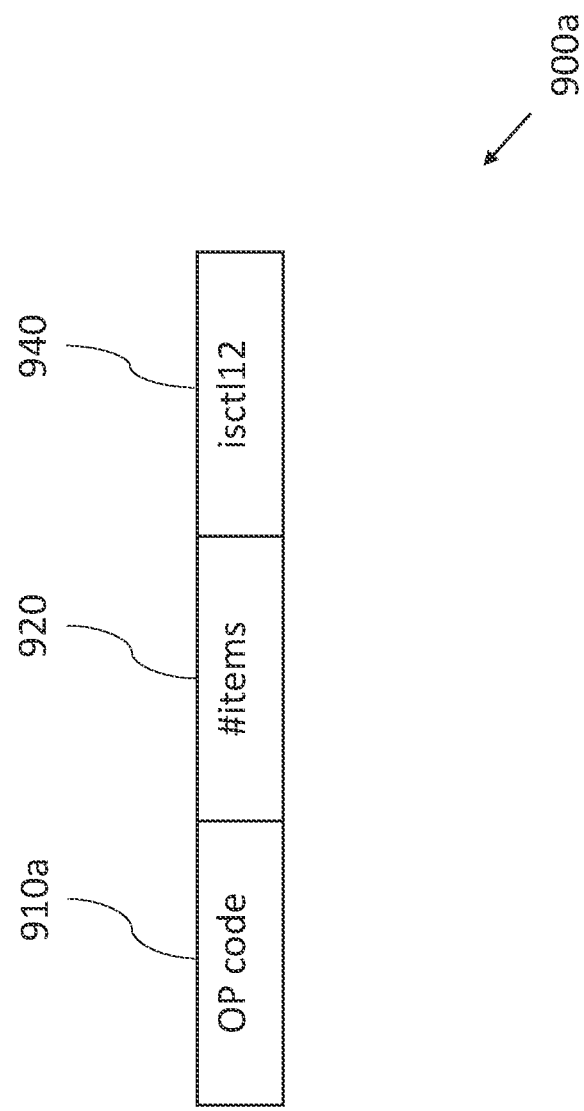
FIG. 9B is an illustration of the fields of a second example send instruction.

Reference is made to FIG. 9B, which shows an example of fields of a second type of SEND instruction 900b that may be executed by the execution 18 to cause sends to be performed. The SEND instruction 900a includes an op code 910a, which identifies the instruction 900a as being a second type of SEND instruction. Similarly to the SEND instruction 900, the SEND instruction 900a includes a field 920 specifying the number of items of data to be sent in response to execution of the instruction, and a field 940 specifying one or more directions in which data is to be sent from the processing device 40. Unlike the first type of SEND instruction 900, the second type of SEND instruction 900a does not include an address field. When an instance of the second type of SEND instruction 900a is executed by the execution unit 18, one or more items of data are sent starting from an address identified by a current state of the read pointer held by the send engine 300. This current state of the read pointer reflects the state of the read pointer following the sending of the previous item of data by the send engine 300.

In this way, the execution unit 18 may execute a SEND instruction to send data from a specified address or may execute a SEND instruction to send data based on a current state of the send engine 300.

Reference is again made to FIG. 3, in which it is shown that the receive engine 320 may be implemented as part of the data in interface 330. The receive engine 320 is configured to cause items of data received at the data in interface 330 from sources (e.g. other processing devices) external to the processing device 40 to be stored in the memory 22. The receive engine 320 maintains a write pointer identifying the location in memory 22 to which the next item of data received on the interface 330 is to be stored. The write pointer may be updated at any time by the execution unit 18 executing a memory pointer update instruction, which writes a new value for the write pointer to the receive engine 320. Additionally, and Independently of this intervention by the execution unit 18, the receive engine 320 updates the write pointer between the receipt of each data item by the receive engine 320. In response to receipt of an item of data at the processing device 40, the receive engine 320 causes that item of data to be stored at a location in the memory 22 identified by the write pointer. Following the storage in memory 22 of that item of data, the receive engine 320 updates the write pointer. The updated write pointer points to a further location in the memory 22, to which a further item of data will be stored upon receipt of that further item of data at the processing device 40.

The updating of the write pointer is performed in accordance with a variable stride pattern stored in the receive engine 320. The variable stride pattern stored by the receive engine 320 is distinct from the variable stride pattern used by the send engine 300. The variable stride pattern stored by the receive engine 320 is referred to herein as the incoming stride pattern. Furthermore, the one or more configuration values defining the incoming stride pattern may be referred to as incoming configuration values.

The incoming configuration values specify the striding behaviour (i.e. how the write pointer is updated) of the receive engine 320 between the storage of different received data items to the memory 22. The incoming stride pattern is configurable by the execution unit 18 by modifying the incoming configuration values. The execution unit 18 may update the incoming configuration values such that a first set of data items received at the processing device 40 prior to the update are stored at locations in memory 22 determined in accordance with a first incoming striding pattern represented by a first set of incoming configuration values, whilst a second set of data items received at the processing device 40 after the update are stored at locations in memory 22 determined using a second incoming striding pattern represented by a second set of incoming configuration values.

The execution unit 18 is, therefore, able to set up a variable stride pattern for receipt of data, which is useful for when a set of data is to be arranged in the memory 22 in a regular repeating pattern. By doing so, the execution unit 18 is able to cause a received set of data to be stored at appropriate locations in memory 22 (e.g. locations that make subsequent processing of data efficient) without needing the execution unit 18 to intervene to update the write pointer each time data is to be written to a new location in the memory 22 that is non-contiguous with the previous write location. This enables a reduction of the code size stored in the instruction memory 12.

In example embodiments, the one or more configuration values held by the send engine 300 and/or the one or more configuration values held by the receive engine 320 may define striding patterns comprising one or more loops. Examples of such loops are illustrated in FIGS. 4 to 7, and are discussed in more detail later. When accessing the memory 22 in accordance with such a looped striding pattern, the engine 300/320 performs a plurality of accesses strided by first stride values defined in the respective configuration values. Following this, the engine 300/320 then modifies the address for the next access by a second stride value, before again applying the first stride value for striding between each of a further plurality of accesses. Table 1 illustrates an example of the configuration values that may be stored in the send engine 300 and the receive engine 320 to define such stride patterns. In the table, each of these stride values is represented by the name of a register in which the respective stride value is stored.

TABLE 1

| Outgoing Configuration Registers | Incoming Configuration Registers |
| --- | --- |
| $OUTGOING_RPT0 | $INCOMING_RPT0 |
| $OUTGOING_STR0 | $INCOMING_STR0 |
| $OUTGOING_RPT1 | $INCOMING_RPT1 |
| $OUTGOING_STR1 | $INCOMING_STR0 |

The outgoing configuration registers are held in the send engine 300, and store the one or more configuration values (i.e. the outgoing configuration values) defining the stride pattern used by the send engine 300. The outgoing configuration values include stride size values, defining the size of the respective stride, and repeat values, which define how many times the respective stride is applied before either a different stride of an outer loop (in which the current stride loop is nested) is applied (if such an outer loop is defined) or until the stride pattern repeats. The stride size may be positive or negative to represent whether the stride is a stride forward in memory to a higher memory address (if the stride is positive) or is a stride backwards in memory to a lower memory address (if the stride negative). Table 1 shows configuration values for three different types of stride. A first stride is the performed in an inner loop, and is referred to herein as the inner stride. A second stride is performed in a loop in which the inner loop is nested, and is referred to herein as the mezzo stride. A third stride is performed in a loop in which the mezzo stride loop is nested, and is referred to herein as the outer stride.

A first repeat value (referred to herein as the inner repeat value) held in $OUTGOING_RPT0 defines the number of times the inner stride is applied by the send engine 300 before either the mezzo stride is performed or the entire variable stride pattern repeats. In embodiments, the size of the inner stride is not configurable, but is hardcoded to the value of the smallest unit of memory access (i.e. to the size of one atom of the memory 22). A second stride size value (referred to herein as the mezzo size) held in $OUTGOING_STR0 defines the size of the mezzo stride, which is applied after the inner stride has been applied the number of times defined in the $OUTGOING_RPT0 register. A second stride repeat (referred to herein as the mezzo repeat value) value held in $OUTGOING_RPT1 defines a number of times that the mezzo stride is applied by the send engine 300 before either the outer stride is applied or the entire variable stride pattern repeats. A third stride size value (referred to herein as the outer size) held in $OUTGOING_STR1 defines the size of the outer stride, which is applied after the mezzo stride has been applied a number of times defined in the $OUTGOING_RPT1 register. The outer stride is applied only once for each repetition of the stride pattern.

The incoming configuration register are register held in the receive engine 320 that store the one or more configuration values (i.e. the incoming configuration values) defining the stride pattern used by the receive engine 320. These values have equivalent meanings to the outgoing configuration values used by the send engine 300. A first repeat value (referred to herein as the inner repeat value) held in $INCOMING_RPT0 defines the number of times the inner stride is applied by the receive engine 320 before either the mezzo stride is performed or the stride pattern repeats. In embodiments, the size of the inner stride is not configurable, but is hardcoded to the value of the smallest unit of memory access (i.e. to the size of one atom of the memory 22). A second stride size value (referred to herein as the mezzo stride size) held in $INCOMING_STR0 defines the size of the mezzo stride, which is applied after the inner stride has been applied the number of times defined in the $INCOMING_RPT0 register. A second stride repeat (referred to herein as the mezzo repeat value) value held in $INCOMING_RPT1 defines a number of times that the mezzo stride is applied by the receive engine 320 before either the outer stride is applied or the stride pattern repeats. A third stride size value (referred to herein as the outer stride size) held in $INCOMING_STR1 defines the size of the outer stride, which is applied after the mezzo stride has been applied a number of times defined in the $INCOMING_RPT1 register. The outer stride is applied only once for each repetition of the stride pattern.

Figure 4:
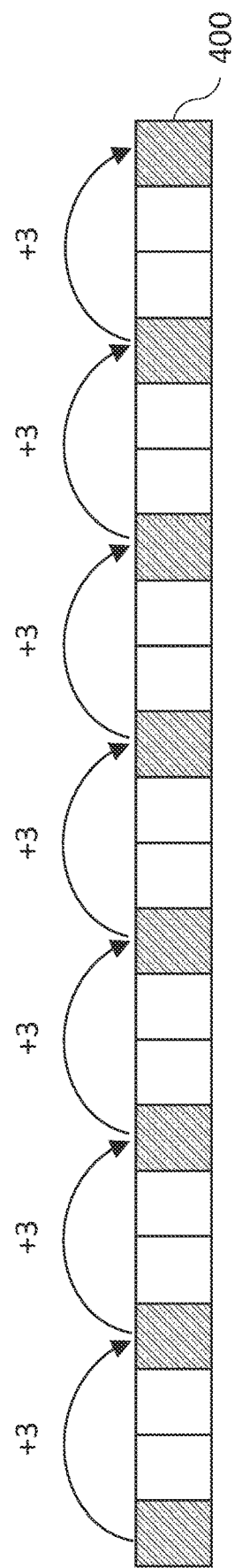
FIG. 4 is an illustration of a single stride pattern.

Reference is made to FIG. 4, which illustrates an example stride pattern, which may be applied by the send engine 300 for identifying locations in memory 22 from which data is to be sent to at least one destination external to the processing device, or which may be applied by the receive engine 320 for selecting locations in memory 22 at which data is to be stored. FIG. 4 illustrates a portion 400 of the memory 22 divided into units (referred to as atoms), which represent the storage space for storing a single item of data that is sent from or received at the processing device 40 in a single data packet. In embodiments, each of these atoms is 32 bits in size. The hashed units of memory 22 are those which are accessed by the send engine 300 or the receive engine 320 in order to send and receive data.

The strides shown in FIG. 4 are all strides of a single stride size (e.g. +3 units in this example). These strides of a single stride size may be performed using the mezzo stride or the outer stride discussed above with respect to table 1. In this example, the inner stride is unused by the engine 300/320, a situation that may be achieved by setting the inner repeat value (e.g. held in $OUTGOING_RPT0 or $INCOMING_RPT0) to zero, such that no inner strides are performed. Likewise, the one of the mezzo stride or the outer stride that is unused by the engine 300/320, may be configured to be unused by setting either the size value or the repeat value for the respective stride type to zero. The one of the mezzo stride or the outer stride (which is used by the engine 300/320) is applied by setting the stride size value for that stride to a value of +3 atoms of memory 22.

Figure 5:
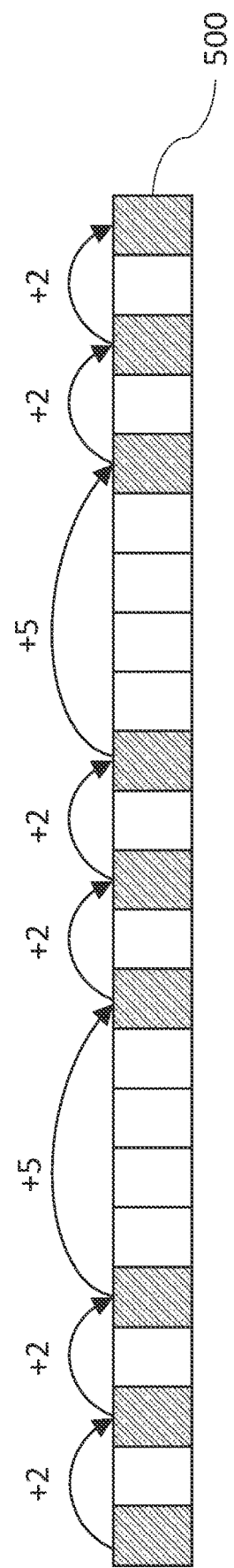
FIG. 5 is an illustration of a dual stride pattern.

Reference is made to FIG. 5, which illustrates a further example stride pattern, which may be applied by the send engine 300 for selecting data from memory 22 to be sent to at least one destination external to the processing device 40, or which may be applied by the receive engine 320 for selecting locations in memory 22 at which data is to be stored. As with FIG. 4, a portion 500 of the memory 22 is shown divided into atoms (e.g. of 32 bits), each for storing an item of data sent/received in a single data packet. The hashed boxes represent the atoms accessed by the engine 300/320 for sending data from or storing data to.

The strides shown in FIG. 5 includes strides of two different sizes. One of these strides involves striding in the memory 22 by +2 units between accesses made to the memory 22. The other of these strides involves striding in the memory 22 by +5 units between accesses made to the memory 22. Such a pattern may be achieved by setting the inner repeat value (e.g. held in $OUTGOING_RPT0 or $INCOMING_RPT0) to zero such that no inner strides are performed. The mezzo stride size is then set to +2, whilst the mezzo repeat value is set to two. As a result, and as shown in FIG. 5, a stride of size +2 is performed after the first access to the memory 22 followed by a stride of size +2 being performed after the second access to the memory 22. The outer stride size is set to +5. As a result, and as shown in FIG. 5, once the mezzo stride has been performed a number of times specified by the outer repeat value, the outer stride is performed a single time.

Figure 6:
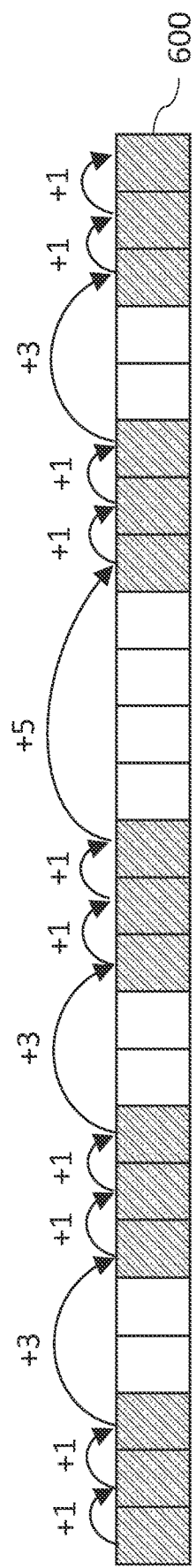
FIG. 6 is an illustration of a triple stride pattern.

Reference is made to FIG. 6, which illustrates a further example stride pattern, which may be applied by the send engine 300 for selecting data from memory 22 to be sent to at least one destination external to the processing device 40, or which may be applied by the receive engine 320 for selecting locations in memory 22 at which data is to be stored. FIG. 6 illustrates the use of the example striding pattern for performing accesses to a portion 600 of the memory 22.

The strides shown in FIG. 6 includes strides of three different sizes (i.e. +1, +3, +5). As part of achieving the stride pattern shown in FIG. 6 the inner repeat value (e.g. held in $INCOMING_RPT0 register and $OUTGOING_RPT0) is set to be two. As a result, and as shown in FIG. 6, a stride of size +1 is performed following a first access to the memory 22, followed by another stride of size +1 being performed after the second access to the memory 22. The mezzo stride size is set to +3, with the mezzo repeat value being set to two. As a result, and as shown in FIG. 6, a stride of +3 is performed after completing a set of inner strides. The stride of +3 is performed twice before performing the outer stride. The outer stride size is set to +5, which results in a stride of +5 being performed after all of the mezzo and inner strides specified by the inner and mezzo repeat values for the pattern have been performed. After the outer stride, the same pattern of inner strides and mezzo strides is again repeated.

Figure 7:
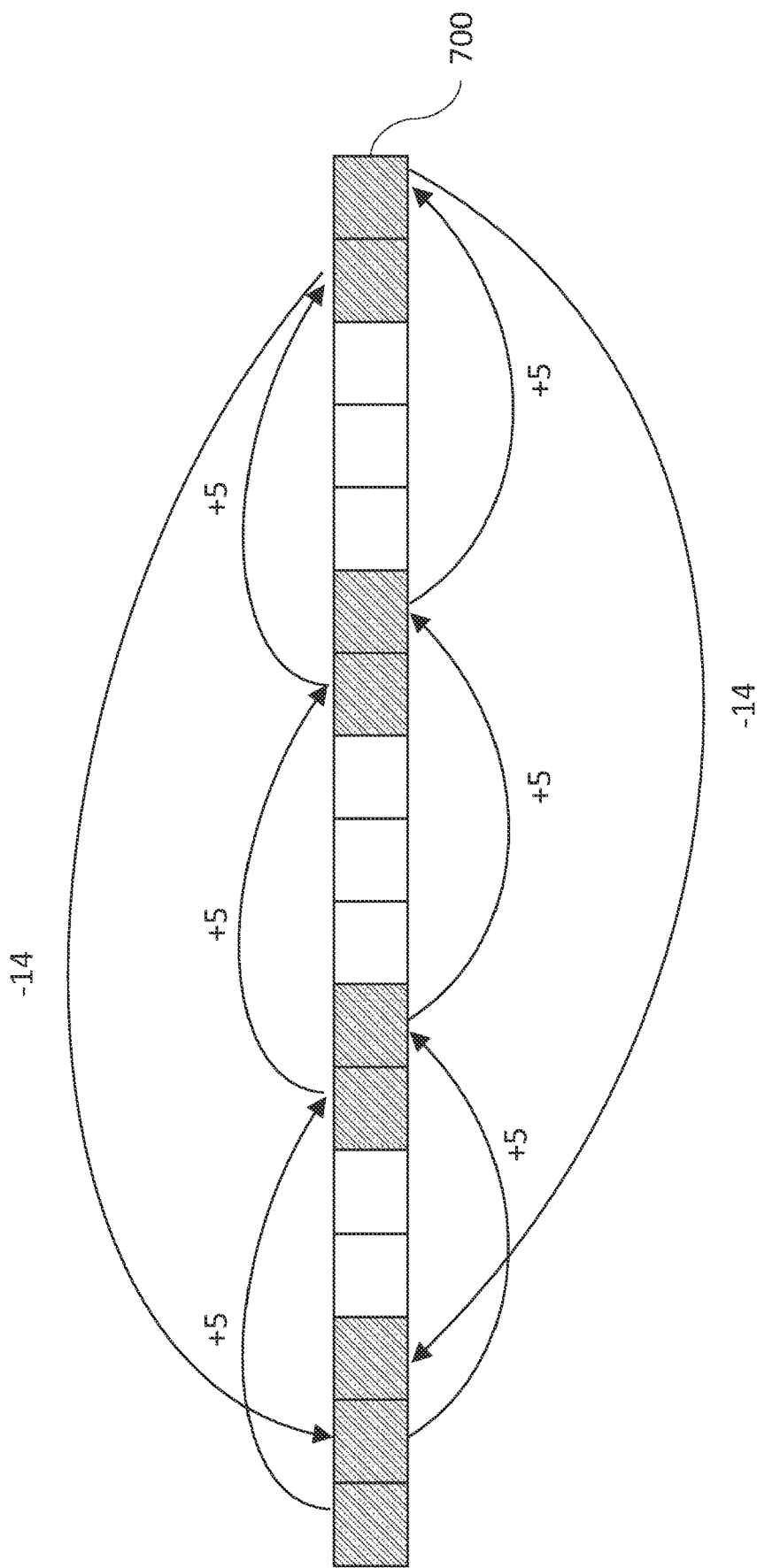
FIG. 7 is an illustration of a stride pattern including negative strides.

Reference is made to FIG. 7, which illustrates a further example stride pattern, which may be applied by the send engine 300 for selecting data from memory 22 to be sent to at least one destination external to the processing device 40, or which may be applied by the receive engine 320 for selecting locations in memory 22 at which data is to be stored. FIG. 7 illustrates this example striding pattern for performing accesses to a portion 700 of the memory 22.

In the pattern of FIG. 7, the outer stride is set to a negative value (−14), which causes the pointer of the engine 300/320 to jump back to a lower memory address after completing a set of mezzo strides. The mezzo stride size is set to +5 with a mezzo repeat value of three. The result is that after completing three mezzo strides, the pointer points to an atom that is displaced by 15 atoms from the first atom that was accessed. By striding by −14 atoms, the engine 300/320 next accesses the atom immediately following the first atom that was accessed. The engine 300/320 then repeats the set of mezzo strides, before again striding backwards via the outer stride.

In FIG. 7, the first set of mezzo strides plus the first outer stride are shown on the top half of the diagram, whilst the second set of mezzo strides plus the second outer stride are shown on the bottom half of the diagram. The stride pattern illustrated in FIG. 7 causes accesses to be performed to all of the atoms of the portion 700 of memory 22 if a sufficient number of data items are sent and received using this stride pattern. However, for simplification of the Figure, only a subset of the atoms of the portion 700 of memory 22 are shown as being accessed.

Figure 8:
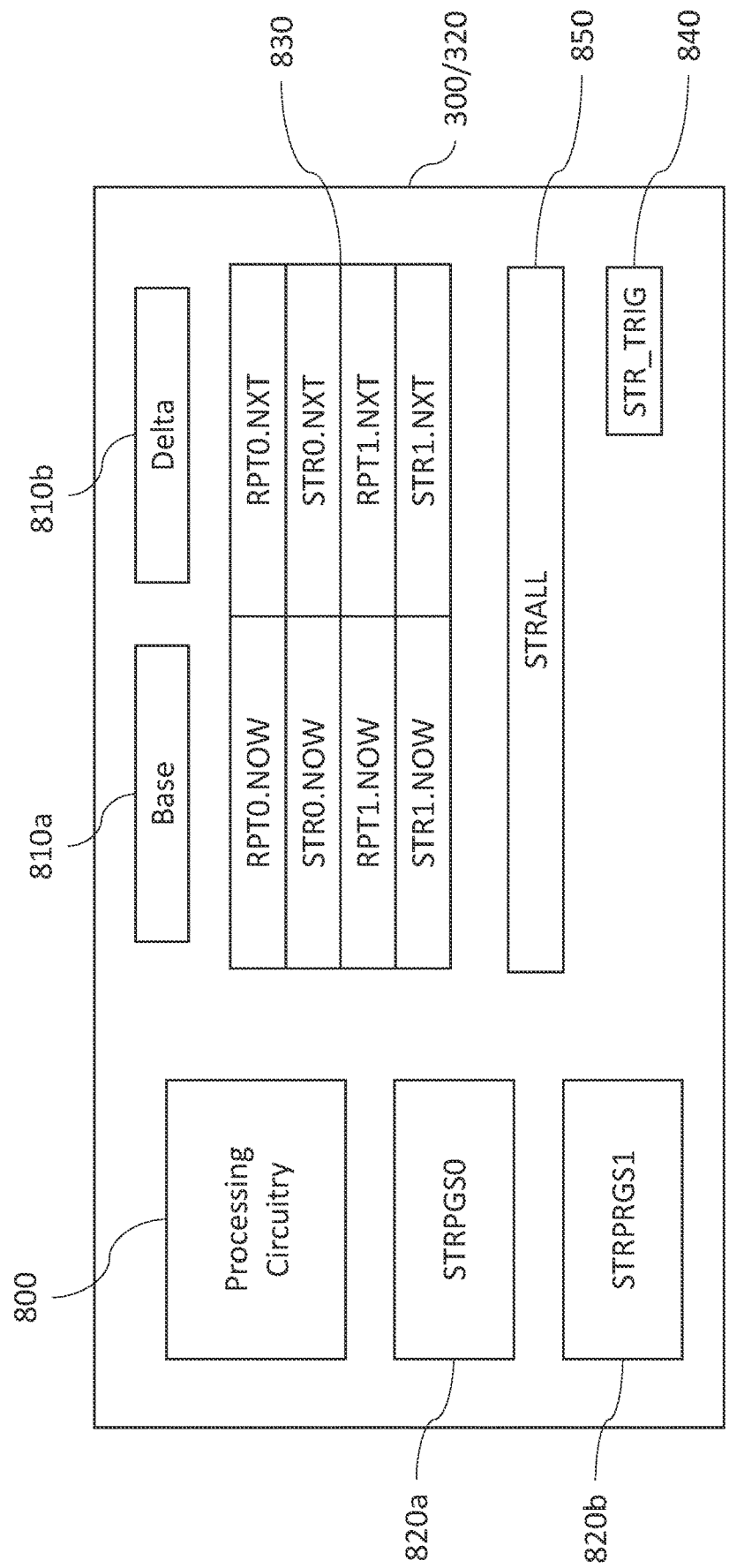
FIG. 8 is an illustration of a send/receive engine that is part of the processing device.

Reference is made to FIG. 8, which illustrates an example of an engine 300/320, which may be the receive engine 320 or the send engine 300. Unless explicitly specifically stated as applying to the receive engine 320 or the send engine 300, the features described with reference to FIG. 8 are features of both the receive engine 320 and the send engine 300.

The engine 300/320 comprises processing circuitry 800 for accessing memory 22 in accordance with the variable stride patterns as described. The operations described herein as being performed by the send engine 300 or receive engine 320 are performed by the processing circuitry 800 of that engine. The processing circuitry 800 may be a processor configured to execute computer readable instructions to perform the operations described. Additionally or alternatively, the processing circuitry 800 may comprise dedicated hardware (e.g. a field programmable gate array or application specific integrated circuit) for performing the operations described.

If belonging to the send engine 300, the processing circuitry 800 is responsive to SEND instructions executed by the execution unit 18 to load items of data from memory 22 at locations determined in accordance with a defined variable stride pattern and dispatch these in data packets. In particular, in response to execution by the execution unit 18 of each such SEND instruction, the send engine 300 causes a data item to be: accessed from a location in memory 22 identified by the pointer of the send engine 300, and sent in a data packet from the processing device 40. The processing circuitry 800 then increments the pointer by an amount specified by the variable stride pattern for the send engine 300, so as to point to the next data item in memory 22 to be sent by the send engine 300. If the SEND instruction that was executed specified that multiple data items are to be sent, the send engine 300 then sends the next data item pointed to by the pointer without waiting for another instance of the SEND instruction to be executed by the execution unit 18. However, if the SEND instruction did not specify multiple data items, then the next data item pointed to by the pointer is only sent when a further instance of the SEND instruction is executed by the execution unit 18.

If the processing circuitry 800 belongs to the receive engine 320, the circuitry 800 is configured to, upon receipt of a data item, cause that data item to be stored at a location in memory 22 identified by the pointer of the receive engine 320. The processing circuitry 800 then increments the pointer by an amount specified by the variable stride pattern for the receive engine 320 so as to point to the next location in memory 22 at which data is to be stored when a further data item is received.

The pointer may comprise two parts, i.e. a base address and a delta. The base address is stored in storage 810a, whilst the delta is stored in storage 810b. Together the base address and the delta represent the pointer, which identifies the next location in memory 22 that it to be accessed by the engine 300/320 either for retrieving data for sending (if the send engine 300) or for storing received data (if the receive engine 320). The address identified by the pointer is given by the sum of the base address and the delta. The base address is a semi-static value and is not updated either directly by SEND instructions, or by the striding activity of the engine 300/320. On the other hand, the delta may be set by execution of SEND instructions (in the case of the send engine 300) or by execution of a memory pointer update instruction (in the case of the receive engine 320). The delta value is also updated by the engine 300/320 in accordance with the variable stride pattern currently active for that engine 300/320. For example, after performing the first access to memory 22 following establishment of the stride pattern, the delta value is incremented by a stride value specified as part of the stride pattern active for the respective engine 300/320. The second access to memory 22 then takes place at the new identified location. The processing circuitry 800 continues to update the delta in accordance with the active stride pattern between each access to memory 22. In this way, the pointer is updated between each access made to the memory 22 whilst a stride pattern is active.

The engine 300/320 comprises a plurality of registers, which control the operation of the engine 300/320. These registers are part of the control registers 28 of the supervisor thread, which are discussed above with respect to FIG. 2. The control registers 28 are accessible to the supervisor thread running on the execution unit 18.

Counter registers 820a, 820b are provided as part of the engine 300/320. These counters enable the engine 300/320 to determine its progress in its configured stride pattern and therefore determine the next stride to be applied. The counter registers 820a, 820b are initialised to zero at the start of a stride pattern being applied. A value held in a first counter register 820a (shown as STRPGS0) is incremented each time an inner stride is performed. Once the value of counter register 820a reaches the inner stride repeat value, a different stride (i.e. a mezzo or outer stride) is performed instead of the inner stride and the counter register 820a is reset. A value in second counter register 820b (shown as STRPRGS1) is incremented each time a mezzo stride is performed. Once the value of counter register 820b reaches the mezzo repeat value, either an outer stride in place of the mezzo stride will be performed or the stride pattern is repeated (if no outer stride is configured as part of the stride pattern). Additionally, the second counter register 820b is reset.

The counter registers 820a, 820b are read only status registers of the supervisor thread. The registers 820a, 820b are read only in the sense that the supervisor thread may not modify the values held in the registers 820a, 820b, despite them being modifiable (i.e. by incrementation or by reset) by the processing circuitry 800 of the engine 300/320. The register 820a and the register 820b of send engine 300 may be referred to as $OUTGOING_STRPGS0 and $OUTGOING_STRPGS1, respectively. The register 820a and the register 820b of receive engine 320 may be referred to as $INCOMING_STRPGS0 and $INCOMING_STRPGS1, respectively.

The engine 300/320 comprises configuration registers 830 storing one or more stride configuration values.

Each of the registers 830 is divided into two parts. A first part of each register contains a configuration value for a currently active variable stride pattern. The parts of the registers 830 holding the configuration values defining the currently active stride pattern are indicated by ".NOW". The processing circuitry 800 uses these configuration values held in the .NOW part of the registers 930 to update the read/write pointer between different accesses to the memory 22.

In addition to storing the currently active configuration values, the configurations registers 830 also store a further set of configuration values that define a further striding pattern to be applied following the currently active stride pattern. The further set of configuration values are indicated by ".NXT". In embodiments, to update the currently active stride pattern, the execution unit 18 first executes one or more instructions to update one or more of the configuration values held in the .NXT part of the registers 830. Subsequently, the execution unit 18 causes, after the updating of the .NxT values, the .NxT values to be copied to the .NOW part of the registers 830 so as to overwrite the .NOW values. Writing the values to the .NOW part of the registers 830 causes these values to be committed. The writing of the .NOW values is performed by the execution unit 18 writing a trigger value to the trigger register 840 that is part of the engine 300/320. In addition to causing the .N×T values to be copied so as to overwrite the .NOW values, the writing to the trigger register 840 also causes the values of counters 820a, 820b to be reset.

Each of the configuration registers 830 stores two values, one of them being a .NXT value and the other being a .NOW value. The configuration registers 830 include a register (RPT0) storing two inner stride repeat values, a register (STR0) storing two mezzo stride size values, a register (RPT1) storing two mezzo stride repeat values, and a register (STR1) storing two outer stride size values. For the send engine 300, the registers 830 include two sets of the outgoing configuration values described above with respect to table 1. For the receive engine 320, the registers 830 include two sets of the incoming configuration values described above with respect to table 1.

Having the capability to store two sets of configuration values (i.e. the .NOW values and the .N×T values) defining two different stride patterns, allows the engine 300/320 to prepare configuration values for a new stride pattern, whilst the old stride pattern is still in use for accessing memory 22. In this way, the engine 300/320 may move seamlessly between stride patterns without interruption to the current send and receive activity.

In the case of the receive engine 320, one or more instructions to update the configuration values for the stride may be executed by the execution unit 18, whilst one or more data packets are being received at the processing device 40. In response to the execution of the one or more instructions by the execution unit 18, the execution unit 18 causes one or more of the values held in the .NXT configuration registers to be updated. The receive engine 320 meanwhile continues to use the configuration values held in the .NOW registers to update the write pointer to memory 22. The execution unit 18 then causes a trigger value to be written to the register 840 so as to cause the processing circuitry 800 of the receive engine 320 to commit the new values written to the .NXT part of the registers 830 by overwriting the current .NOW values with those new values. These new values will then be used by the receive engine 320 to update the pointer to determine the locations in memory 22 at which further items of data to be stored. In this way, the receive engine 320 switches between the use of two different stride patterns.

For the send engine 300, the seamless shift between two stride patterns may be performed using a new type of instruction, referred to herein as the SENDPSTREX instruction. The SENDPSTREX instruction represents a third type of SEND instruction, in addition to SEND instruction 900 and SEND instruction 900a discussed above. The SENDPSTREX instruction combines send and put functionality. The instruction, when executed by the execution unit 18, causes a send from memory 22 to be performed in addition to updating configuration values held in the register 830. The use of the instruction allows a stream of sends from memory 22 to continue uninterrupted whilst, at the same time, updating the configuration values defining the stride pattern. When the SENDPSTREX instruction is executed by the execution unit 18, the execution unit 18 updates one or more of the configuration values held in the .NXT part of the configuration registers 830. The execution unit 18 also, as a result of executing this instruction, causes the send engine 300 to send an item of data from memory 22 at a location identified by the read pointer of the send engine 300. After the send engine 300 has performed both the send for the instruction and the update to the .N×T values, the execution unit 18 causes a trigger value to be written to the register 840. In response, the send engine 300 commits the new configuration values by copying them from the .NXT part of the registers 830 to the .NOW part of the registers 830.

Other than being used to update the outgoing stride configuration values, the SENDPSTREX instruction 1000 allows for the update of the incoming configuration values without interrupting a sequence of sends. For example, the instruction memory 12 may store instructions for sending a plurality of data items from memory 22. During a time period during which this plurality of data items is to be sent, it may be required for the execution unit 18 to intervene to update the incoming stride pattern currently in use by the receive engine 320. The SENDPSTREX 1000 enables this to be performed by combining the functionality of a SEND instruction for sending data with the functionality of a PUT instruction for updating the incoming configuration values. This greatly simplifies the compilation of the program held in the instruction memory 12, since the sequence of SEND instructions may be compiled without dependence upon the pattern of data receipt at the processing device 40. Once the pattern of receipt of data at the processing device 40 is determined, some of the SEND instructions for allocation to the processing device 40 may be converted to SENDPSTREX instructions (so as to update the incoming stride configuration as required), without requiring the timing of execution of the SEND instructions to be re-arranged.

Figure 10:
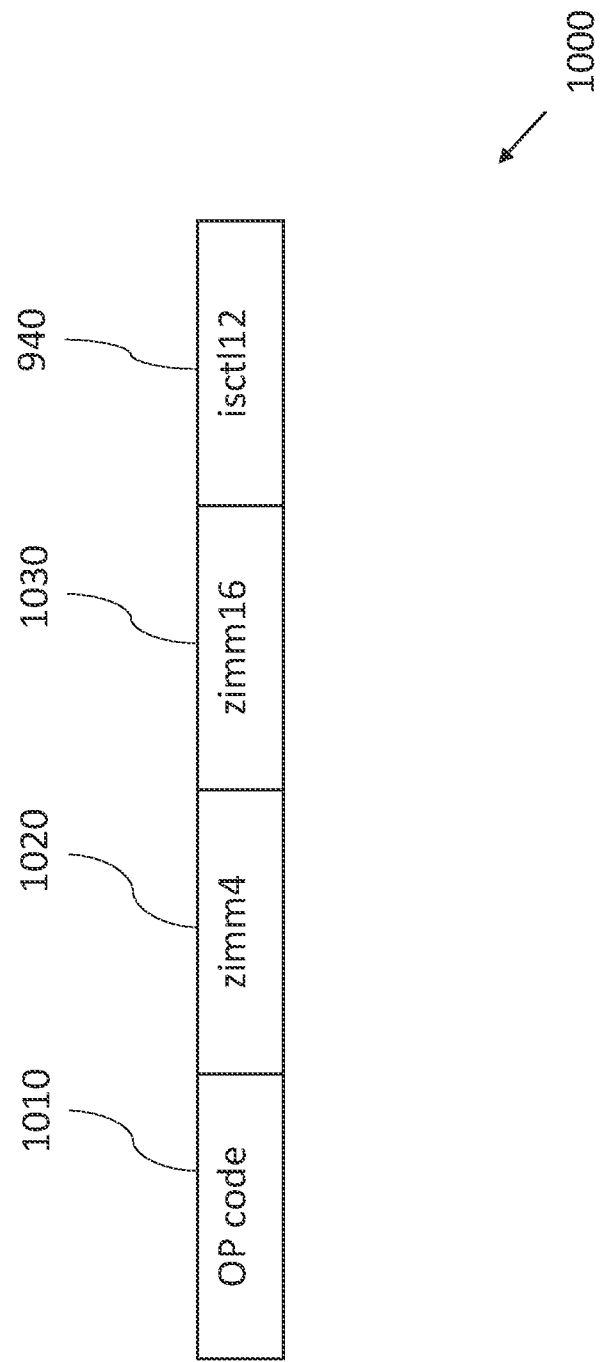
FIG. 10 is an illustration of the fields of a third example send instruction, which combines send and put functionality.

Reference is made to FIG. 10, which illustrates an example of the fields of the SENDPSTREX instruction 1000. A first field 1010 is the op code, which identifies the SENDPSTREX instruction 1000 as a SENDPSTREX instruction. A second field 1020 identifies which of the registers (i.e. $OUTGOING_RPT0, $OUTGOING_STR0, $OUTGOING_RPT1, $OUTGOING_STR1, $INCOMING_RPT0, $INCOMING_STR0, $INCOMING_RPT1, $INCOMING_STR1) is to be updated in response to execution of the SENDPSTREX instruction 1000. A third field 1030 provides the configuration value to be written to the identified register. A fourth optional field 940 specifies a direction in which one or more data items transmitted in response to the instruction are sent along an exchange. In embodiments, the fourth field 940 may be set to a certain value (e.g. both of the east and west flags are set to 0) such that no send is performed when the SENDPSTREX instruction is executed. In this way, the SENDPSTREX instruction may be used to update the configuration values defining the variable stride pattern for the send engine 300 without a send of any data being performed. In embodiments, the SENDPSXTREX instructions does not include a field specifying the number of items of data to be sent when the instruction is executed, but rather a single item of data is sent in response to the execution of a single instance of the instruction.

A further register 850 is shown illustrated in FIG. 8. This register may be referred to herein as the strall register 850. When belonging to the send engine 300, the register 850 is labelled as $OUTGOING_STRALL and when belonging to the receive engine 320, the register 850 is labelled as $INCOMING_STRALL.

The strall register 850 allows all of the configuration values defining a variable stride pattern for the engine 300/320 to be written with a single write to the strall register 850. The strall register 850 may store a single value, which can be considered as comprising a plurality of subfields, each of which maps to a different one of the configuration values. For example, the strall register 850 may comprise a single 16 bit value comprising four 4-bit subfields, each of which maps to a different one of the configuration values. A mapping function defines how each subfield maps to a configuration value. For example, the mapping function may be such that the corresponding configuration value for a subfield is given by the value of the subfield to the power of two.

The strall register 850, therefore provides a means by which the execution unit 18 can update a plurality of configuration values for a stride pattern by making a single write to the register 850 as opposed to a plurality of writes over several processor clock cycles. When the execution unit 18 writes to this register 850, the processing circuitry 800 uses the value written to the register 850 to update a plurality of the configuration values in register 830. In embodiments, the strall register 850 maps to the .NXT configuration values enabling multiple ones of these to be updated with a single write to the register 850.

When implemented in the send engine 300, the strall register 850 may be used with the SENDPSTREX instruction. In this case, the zimm4 field 1020 discussed above may be used to specify the strall register 850, rather than any of the configuration registers 830. The zimm16 field 1030 specifies the value that is written to the strall register 850 in response to the execution of the instruction SENDPSTREX instruction, so as to cause the processing circuitry 800 to update a plurality of the configuration registers 830.

In some embodiments, the engine 300/320 comprises a plurality of such strall registers, with each of the strall registers being associated with a different mapping function for mapping the subfields held in the respective strall register to the configuration registers 830.

In one embodiment, there are three strall registers in the send engine 300, labelled as:

$OUTGOING_STR_2D0
$OUTGOING_STR_2D1
$OUTGOING_STR_1D

Additionally, there are three strall registers in the receive engine 320, labelled as:

$INCOMING_STR_2D0
$INCOMING_STR_2D1
$INCOMING_STR_1D

Writes to these registers result in derived values being written to a subset of the $INCOMING_RPTn/STRn.NXT or $OUTGOING_RPTn/STRn.NXT registers according to a fixed mapping in the hardware (with a different mapping applied for each of the three strall registers in the engine 300/320).

It has been described that after writing to the .NXT fields of the configuration register 830, the execution unit 18 causes a value to be written to the trigger register 840 to cause the values written to the .NXT fields to be committed (i.e. to be copied to the .NOW fields). The execution unit 18 may perform this write to the trigger register 840 in response to different conditions. Firstly, when the execution unit 18 executes an instruction (e.g. a SENDPXTREX or PUT instruction) to write to a strall register (e.g. strall register 850), the execution unit 18, after writing to this strall register, writes to the trigger register 840 to cause the new .NXT fields resulting from the write to the strall register to be committed. In this case, there is no need to execute a further instruction to cause the trigger register 840 to be written, but the write to the trigger register 840 is performed in response to the instruction that causes the write to the strall register 850. Secondly, when the execution unit 18 executes one or more instructions (e.g. SENDPXTREX or PUT instruction) to write directly to one or more the .NXT fields in the register 830, the trigger register 840 is not automatically written. In this case, the execution unit 18 executes a further instruction (e.g. SENDPXTREX or PUT instruction) to write to the trigger register 840 to cause the values written to the .NXT fields to be committed.

In some example embodiments, the configuration registers 830 discussed above are part of the control registers 28 of the supervisor thread. These registers 28 are both readable and writable by the supervisor thread. The strall register 850 may be a writable one of the control registers 28 of the supervisor thread. The trigger register 840 may be a writable one of the control registers 28 of the supervisor thread.

Figure 20:
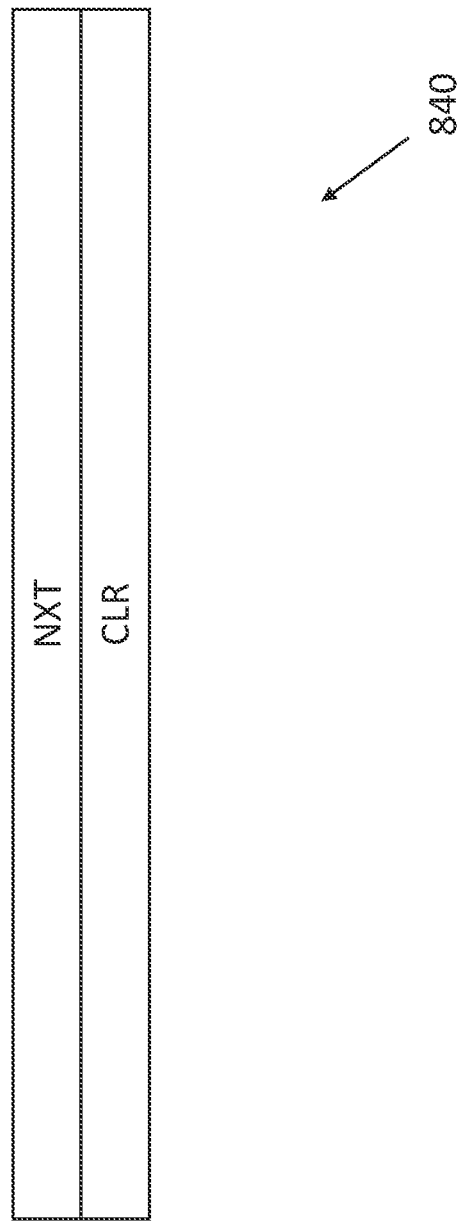
FIG. 20 illustrates the two fields of the trigger register according to one embodiment.

In some embodiments, the trigger register 840 is provided with an additional field, referred to herein as the CLR field for causing variable stride state to be reset. Reference is made to FIG. 20, which illustrates an example of the trigger register 840 comprising two different fields. The execution unit 18 may write to either of these fields independently to cause a different action to be performed.

The trigger register 840 comprises a first field (shown as NXT). If the execution unit 18 performs a write to the NXT field, the values in the .NXT fields are committed (i.e. they are copied to the .NOW fields).

The trigger register 840 also comprises a second field (shown as CLR). If the execution unit 18 performs a write to the CLR field, a clear trigger event is performed, which causes the .NOW values in the configuration registers 830 to be reset to their default values. These default values may be all zeroes, in which case the read/write pointer will be incremented by only one atom after each send/receive. In this case, any striding patterns will be specified explicitly in the code executed in the, i.e. the address values used by the SEND and Memory pointer update instructions may be used to stride to different addresses. The clear trigger event does not, however, cause the .N×T values in the configuration registers 830 to be reset. Therefore, the execution unit 18 may cause the variable striding implemented by the engine 300/320 to be resumed by performing a write to the NXT field of the trigger register 840.

An example of a type of data for which it may be useful to send and receive said data in repeating patterns are matrices. Such matrices may be useful for implementing certain types of machine learning models, such as convolutional neural networks. A plurality of elements of a given matrix may be stored in memory 22 in a regular arrangement, such that it is more for efficient in terms of required code storage space for the execution unit 18 to, rather than specify the address for each individual element of the matrix, configure the send engine 300 to send data in accordance with a striding pattern that causes the pointer to be updated to point to individual elements of the matrix. Likewise, on the receive side, a processing device 40 may receive a matrix from several different sources. For example, one source may provide one column of the matrix, whilst another source provides another column of the matrix. In this case, the execution unit 18 of the device 40 may configure the receive engine 320 with a striding pattern so as to store the elements of a first column discontigously and separated one from the other by a fixed stride, then stride back in memory 22 and store the elements of the second column separated one from the other by the same fixed stride. Such a striding pattern may similar to that shown in FIG. 7.

In some embodiments, the processing device 40 is a tile 4 of a multi-tile processor 2. Reference is made to FIG. 11A, which illustrates an example of such a multi-tile processor 2. Each such processing unit 2 is implemented on its own integrated circuit.

The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 also comprises one or more external links, enabling the processing unit 2 to be connected to one or more other processing units (e.g. one or more other instances of the same processing unit 2). These external links may enable the processing unit 2 to be connected to: a host system; and one or more other instances of the processing unit 2 on the same IC package or card, or on different cards. The processing unit 2 receives work from the host, in the form of application data, which it processes.

The interconnect 34 is configured to enable the different tiles 4 in the array 6 to communicate with one another.

More details of such a multi-tile processing unit 2 are given in U.S. application Ser. No. 16/527,410, which is incorporated by reference.

Figure 11B:
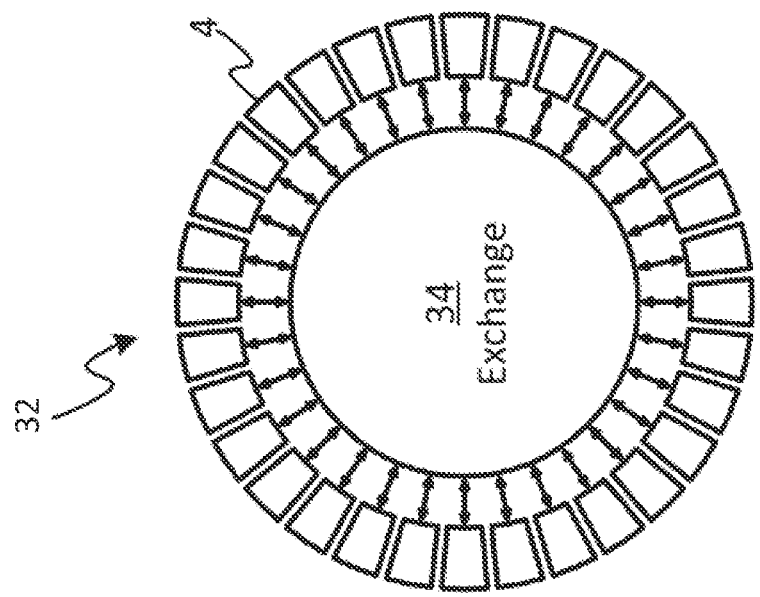
FIG. 11B is a schematic illustration of a plurality of tiles, alternating between a compute phase and exchange phase.
Figure 11B:
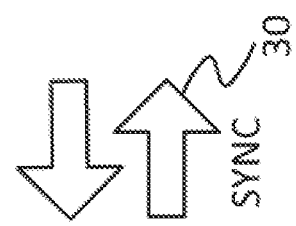
Figure 11B:
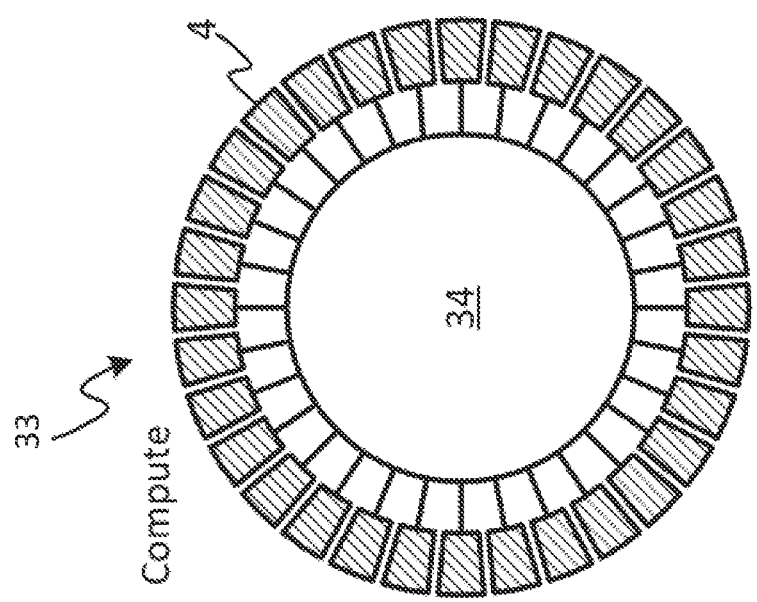

Reference is made to FIGS. 11B, which illustrate an implementation of a BSP exchange scheme in which each tile 4 performs a compute phase 33 and an exchange phase 32 in an alternating cycle, separated from one to the other by a barrier synchronization 30 between tiles. In the case illustrated by FIGS. 11B and 11C, a barrier synchronization is placed between each compute phase 33 and the following exchange phase 32. During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles 4, but does not perform any new computations until it has received from other tiles 4 any data on which its task(s) has/have dependency. Neither does it send to any other tile 4, any data except that computed in the preceding compute phase. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same processing unit 2 or different processing units 2 could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

Figure 11C:
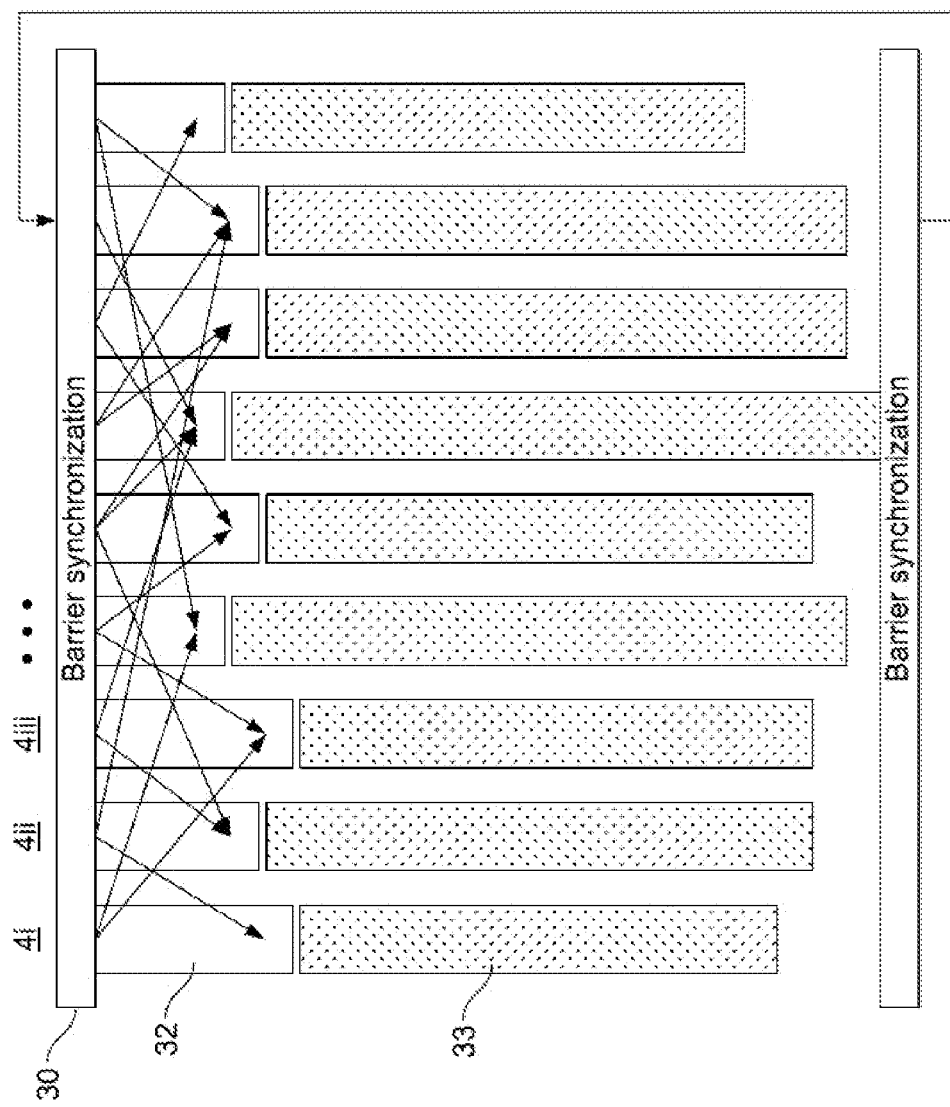
FIG. 11C is a schematic illustration of BSP supercycle of compute and exchange, including a barrier synchronisation.

FIG. 11C illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that, in this arrangement, some tiles 4 are allowed to begin computing 33 whilst some others are still exchanging.

The BSP model is used for exchange of data between tiles 4 on the processing unit 2. The communication between tiles 4 of a processing unit 2 occurs in time deterministic fashion in which data packets are transmitted without headers as in our earlier application U.S. patent application Ser. No. 15/886,315. Additionally, the BSP model may also be used for the exchange of data between processing units 2. Such an exchange of data between processing units 2 is referred to as an external exchange 50'.

During an exchange phase, the instructions executed by the tiles are scheduled to execute at a predefined times so as to enable communication to take place in a time deterministic manner. The instructions that are executed at predetermined times include the SEND instructions, and the instructions (e.g. SENDPXTREX instructions) used to update the variable stride pattern. In this way each tile 4 sends each item of data at the appropriate time, such that a receiving tile 4 will, when it receives a data item, have its write pointer pointing to the appropriate location in memory to store that item of data.

The timing of execution of the SEND instructions and instructions to update the variable stride pattern are arranged with respect to a synchronisation signal issued by the sync controller 36 shown in FIG. 11A. The sync controller 36 issues a signal to each tile 4, marking the start of the exchange phase. The execution units 18 of the tiles 4 then execute each instance of the SEND and variable stride pattern update instructions in allocated processor clock cycles. Each of the allocated processor clock cycles is a predefined number of processor clock cycles following receipt at the respective tile 4 of the synchronisation signal.

Figure 12:
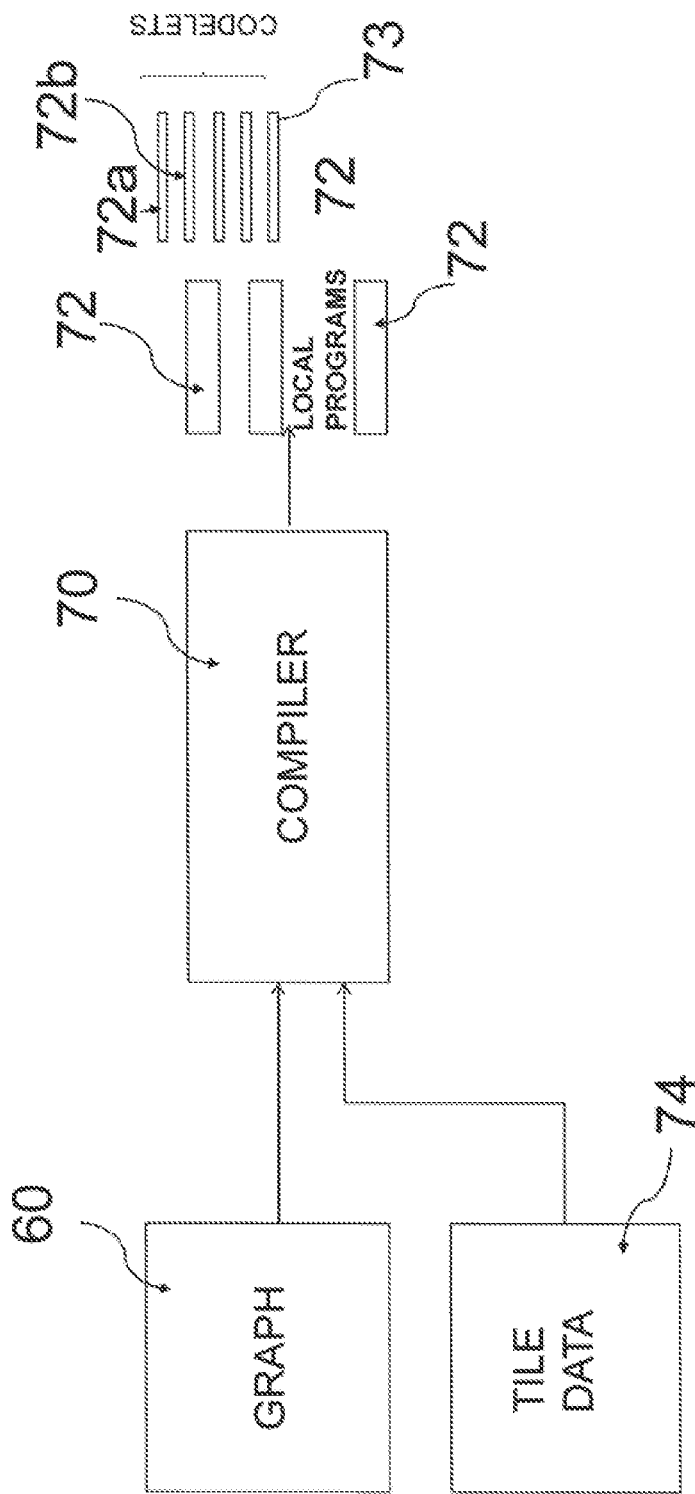
FIG. 12 is an illustration of the compilation of codelets for running on the tiles of the processing unit.

In the multi-tile processing unit 2 embodiment, each of the tiles 4 comprises an instance of the processing device 40 discussed above. Each such tile 4 is configured to store and run a compiled code set provided by a compiler. FIG. 12 is a schematic diagram illustrating the function of a compiler 70. The compiler receives such a graph 60 and compiles the functions in the graphs into a multiplicity of codelets, which are contained into local programs labelled 72 in FIG. 7. Each local program is designed to be loaded into a particular tile of the computer. Each program comprises one or more codelets 72a, 72b . . . plus a supervisor sub-program 73 each formed of a sequence of instructions. The compiler generates the programs such that they are linked to each other. Therefore, when the compiled code sets running on one or more sending tiles 4 have a particular pattern of data to send to a recipient tile 4, the linked compiled set running on the recipient tile 4 configures the receive engine 320 of that tile 4 to store the received data in the memory 22 in a suitable pattern in advance of receipt of that data at the tile 4.

In the case of the receive engine 320, the stride patterns expressed by configuration values in register 830 are used to determine the locations in memory 22 at which data received from other tiles 4 of the same processing unit 2 (i.e. during an internal exchange) is to be stored. In the case of the send engine 300, the stride patterns expressed by configuration values in register 830 are used to determine the locations in memory 22 from which data items are to be sent to tiles 4 of the same processing unit 2 (i.e. during an internal exchange) and tiles 4 of a different processing unit 2 (i.e. during an external exchange).

In some cases, it may be desirable to re-arrange data held in the memory of the processing device, so as to place the data in a more suitable format for subsequent processing. For example, given a set of data held in memory and representing a matrix, it may be desirable to first perform a transpose of the matrix prior to making use of the matrix in one or more calculations.

According to embodiments, the send and receive mechanism described herein may be used to perform the re-arrangement of data held in the memory by activating a loopback mode of the processing device 40. When the loopback mode is activated, rather than send the data to the additional processing devices, the data may be sent via a loopback path, which provides it back to the memory 22 from which it was sent. The data can be re-arranged based on at least one of i) the order in which data is sent from the memory 22 or ii) the arrangement in which the returning data is stored in the memory 22.

Figure 15:
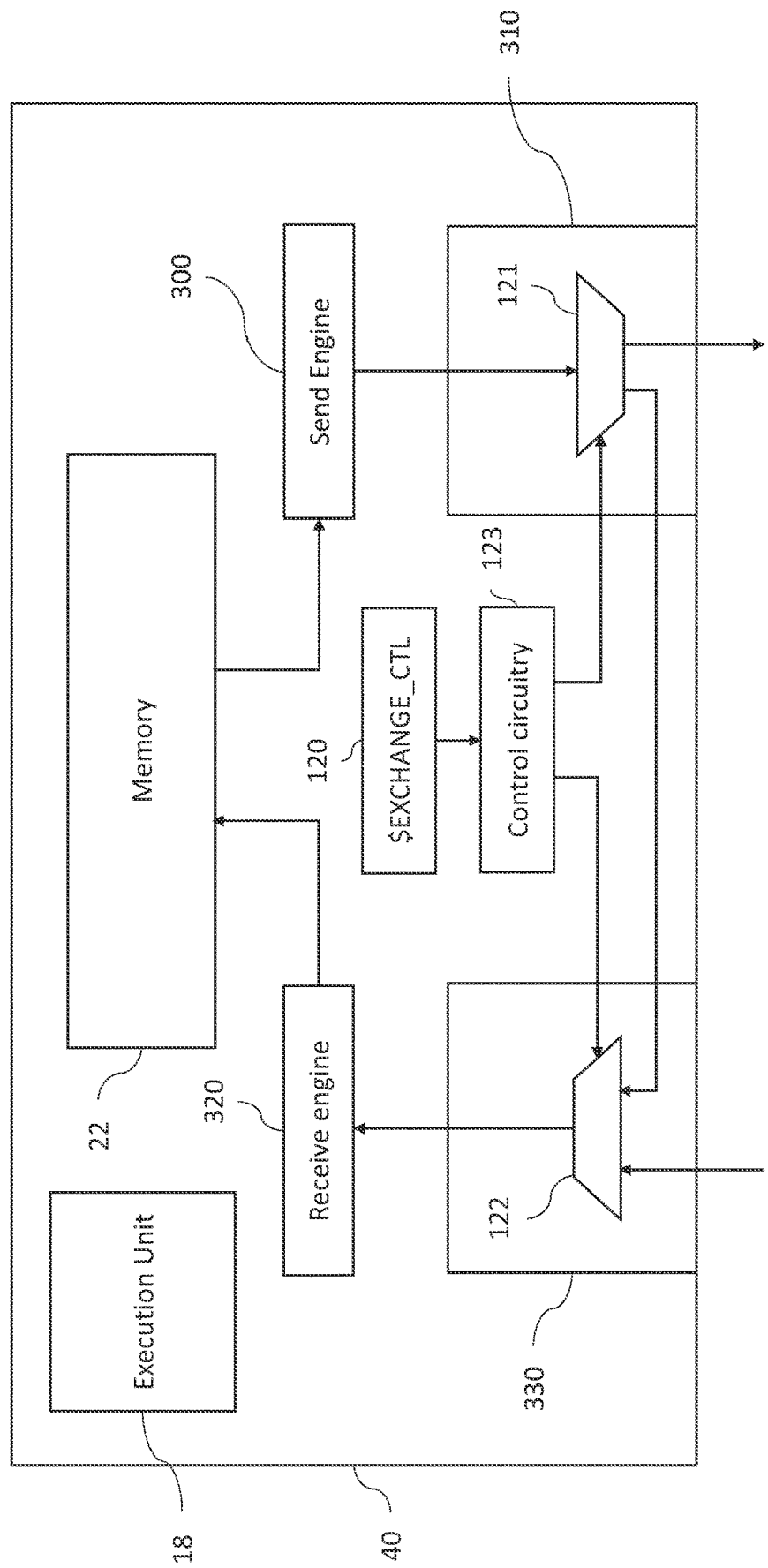
FIG. 15 is a further schematic block diagram of the processing device, showing the loopback path.

Reference is made to FIG. 15, which illustrates a schematic of various components of the processing device 40 that may be used to perform re-arrangement of data in the memory 22 by making use of the send and receive mechanisms described above.

The processing device 40 comprises a control register 120, which stores an indication (which may be referred to as the LOOPBACK field) as to whether the data sent by the send engine 300 is transmitted over the output interface 310 to an external destination or whether the data sent by the send engine 300 is sent along a bus forming a loopback path, via which the data is returned to the memory 22 for storage in the memory 22. The execution unit 18 is operable to execute instructions to update the value of the LOOPBACK field. The execution unit 18 may update the value of the LOOPBACK field to reflect that the loopback mode is enabled such that any data sent after the enablement of the loopback mode is sent via the loopback path. Likewise, the execution unit 18 may update the value of the LOOPBACK field to reflect that the loopback mode is disabled such that any data sent after the disablement of the loopback mode is sent over the interface 310 to an external processing device 40.

When the LOOPBACK field is set to indicate that data is to be sent by the loopback path (i.e. loopback mode is enabled), circuitry 123 of the processing device 40 controls a multiplexer 121 in the output interface 310 to cause data sent from the memory 22 to be directed to the input interface 330 of the processing device 40. The circuitry 123 of the processing device 40 may also control a multiplexer 122 in the input interface 330 so as to select the loopback path as the input, instead of the input for receiving data from a source external to the processing device 40.

A unit of data dispatched from the send engine 300 when loopback mode is enabled is sent along the loopback path to be received at the receive engine 320. The receive engine 320 causes that unit of data to be stored in the memory 22 at the location specified by the current value of the write pointer held in the receive engine 320.

In order to perform re-arrangement of a set of units of data held in the memory 22, the send engine 300 may cause units of data to be sent from the memory 22 via the loopback path in an order that is out of sequence with respect to an order in which the units of data are held in the memory 22. In other words, the chronological order in which the send engine 300 sends the units of data over the loopback path does not match the logical arrangement of the units of data in memory 22. The logical arrangement of units of data in memory 22 is understood to be the arrangement of the units of data by logical memory address.

Alternatively or additionally to the out of order sending by the send engine 300, the receive engine 320 causes units of data to be stored in the memory 22 in an order that is out of sequence with respect to an order in which the send engine 300 sends the units of data via the loopback path. In order words, the receive engine 320 causes the units of data to be stored in the memory 22 in a logical arrangement that does not match the chronological order in which the receive engine 320 receives the units of data.

As noted above, the send engine 300 is operable to send units of data in accordance with a variable stride pattern that is set up by the execution unit 18. Such a variable stride pattern can be used by the send engine 300 to cause the units of data to be sent in an order that is out of sequence with respect to the initial arrangement of the units of data in the memory 22. This has the advantage that fewer instructions may be required to be executed by the execution unit 18 in order to cause the rearrangement of the units of data in memory 22.

Also as noted above, the receive engine 320 is operable to store units of data in memory 22 in accordance with a variable stride pattern that is set up by the execution unit 18. Such a variable stride pattern can be used by the receive engine 320 to cause the units of data to be stored in memory 22 in an arrangement that is out of sequence with respect to an order in which the data is received via the internal loopback path from the memory 22.

Figure 16:
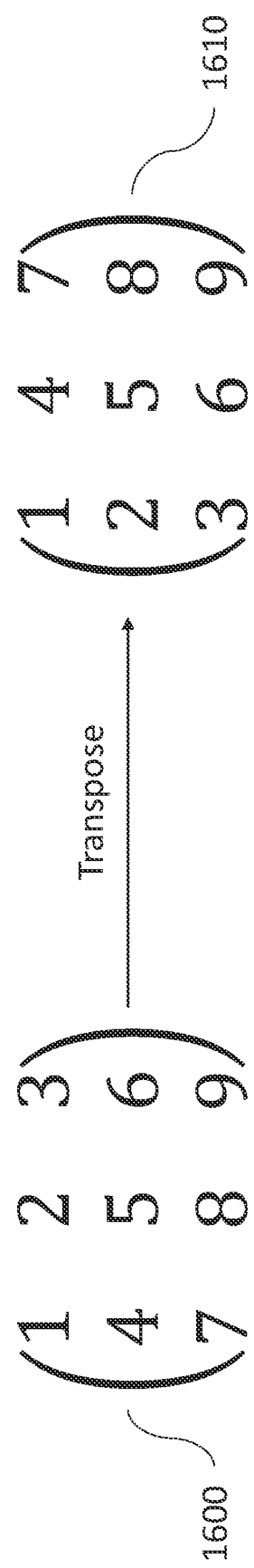
FIG. 16 illustrates a matrix transpose operation that may be performed using the variable stride functionality.
Figure 17:
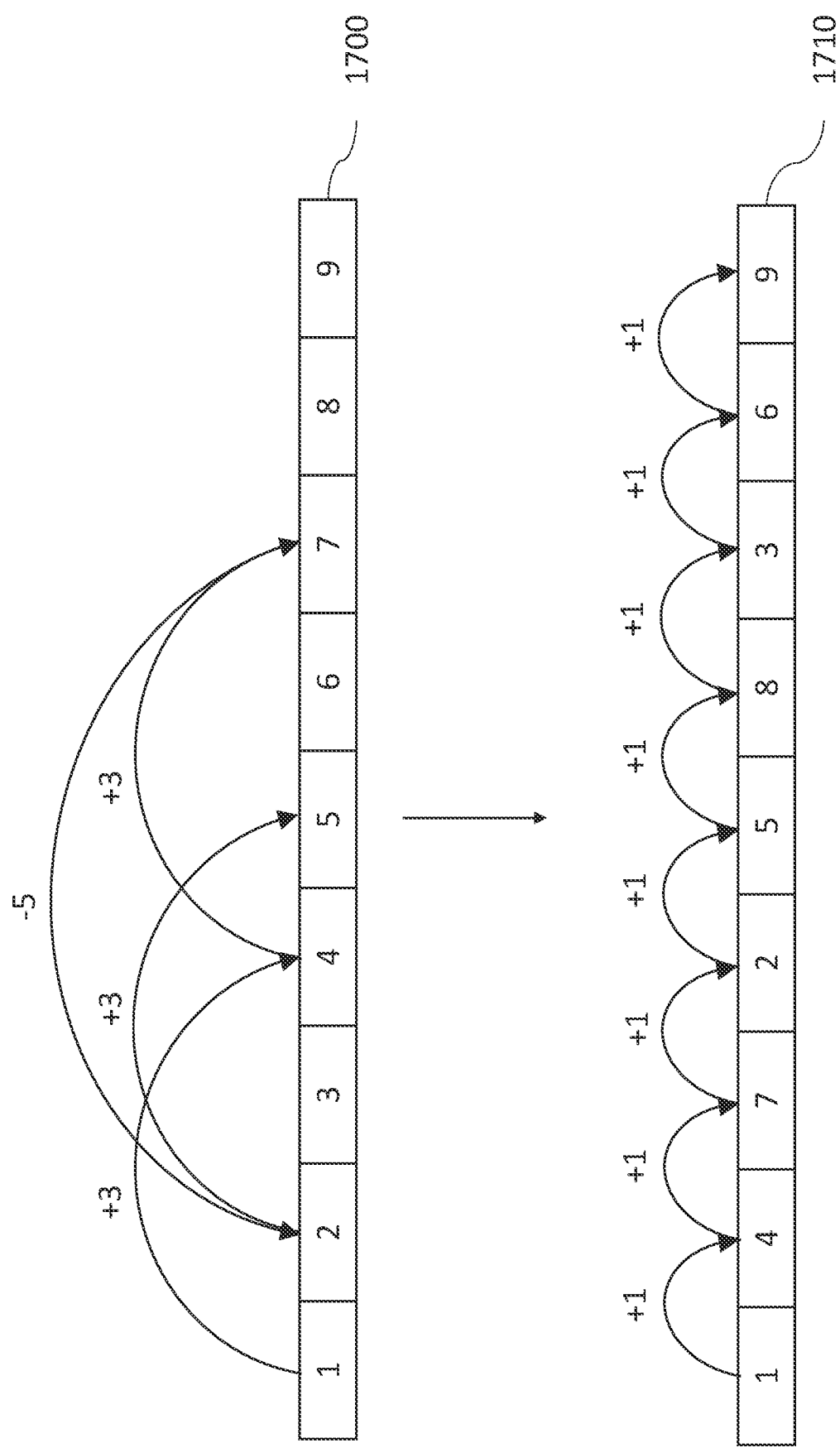
FIG. 17 illustrates a sending pattern applied by the send engine for performing a matrix transpose operation when loopback mode is active.
Figure 18:
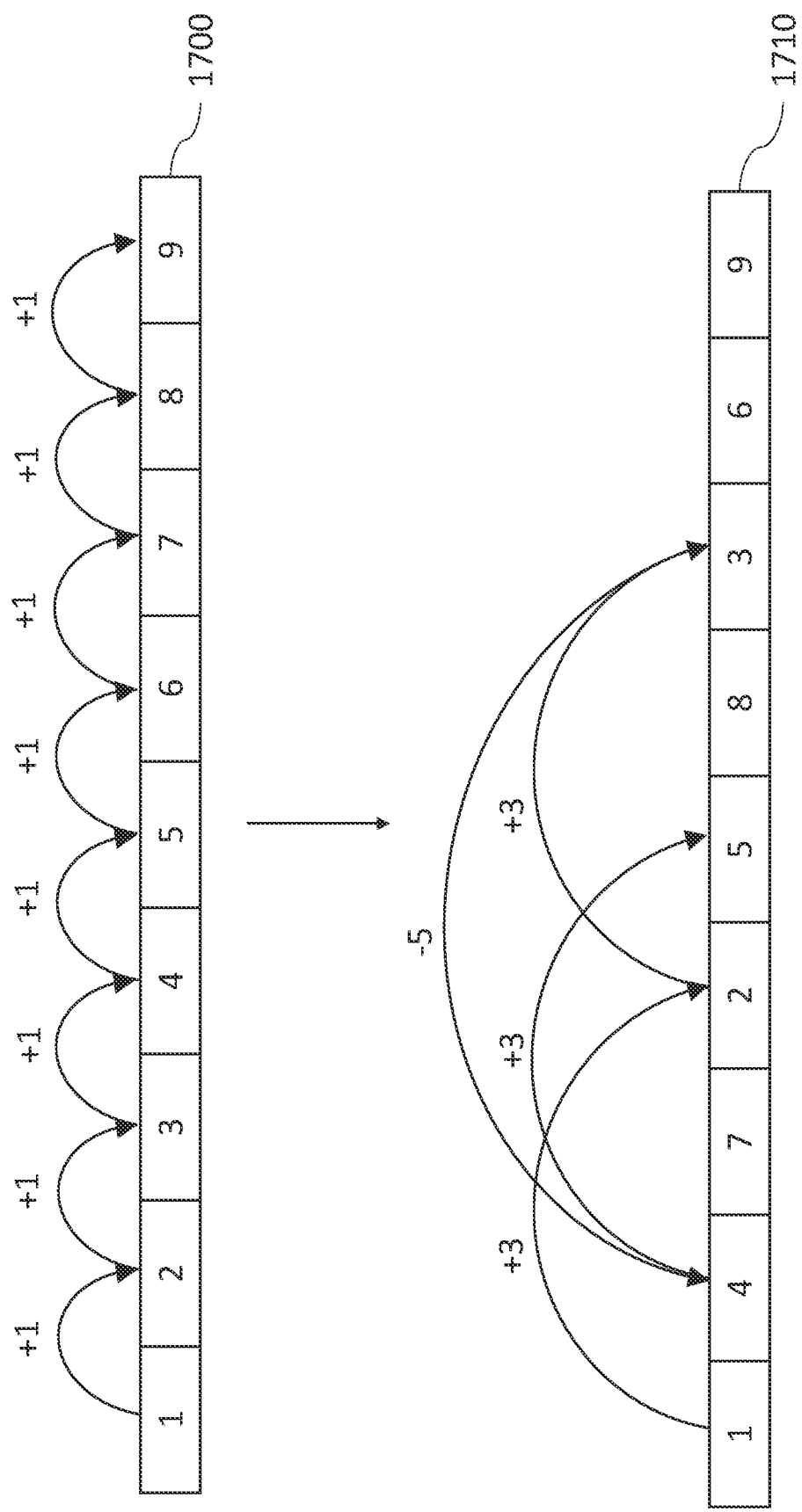
FIG. 18 illustrates a storage pattern used by a receive engine for performing a matrix transpose operation when loopback mode is active.

Reference is made to FIG. 16, which illustrates an example of an operation that may require a re-arrangement of data in memory 22, and where that re-arrangement may be implemented using the scheme by which the data is sent via a loopback path in order to perform the re-arrangement. The operation is a transpose operation, which produces the output matrix 1610 from the input matrix 1600. Supposing that the elements of the matrix 1600 are stored in memory 22 such that the elements are arranged contiguously in the logical address space in the following sequence: [1, 2, 3, 4, 5, 6, 7, 8, 9]. In order to represent the output matrix 1610, it is necessary to re-arrange elements in memory 22 into the following sequence: [1, 4, 7, 2, 5, 8, 3, 6, 9]. FIGS. 17 and 18 present different examples as to how the sequence in which different locations in memory 22 are accessed—either when performing send operations or when storing received data in memory 22—may be used to perform re-arrangement of that data. FIG. 17 illustrates an example in which the sequence in which locations in memory 22 are accessed for sending data from memory 22 is used to perform the data re-arrangement required for the matrix transpose operation illustrated in FIG. 16. FIG. 18 illustrates an example in which the sequence in which locations in memory 22 are accessed for storing data received via the loopback path is used to perform the data re-arrangement required for the matrix transpose operation illustrated in FIG. 13.

Reference is made to FIG. 17, which shows a first portion 1700 of the memory 22 in which a plurality of elements are arranged contiguously in a given sequence. Each of the elements (labelled 1 to 9) represents a single unit of data that is sent in a single data packet in a single processor clock cycle.

The send engine 300 is arranged to send the first unit (labelled 1) from the memory 22. This first unit is the first in the logical arrangement of data units in memory portion 1700. The send engine 300 causes this first unit to be sent from the memory 22 via the loopback path. The receive engine 320 causes this unit of data received via the loopback path to be stored at a first location in the portion 1710 of memory 22. The first location is the first unit of memory for storing a data unit in the logical arrangement of memory units in memory portion 1710.

Following the sending of the first unit of data from the memory 22, the send engine 300 causes the next item of data to be sent from the memory 22. This item is non-contiguous with the first item of data and, in the example of FIG. 17, is the fourth item of data in the logical sequence of data items in the portion 1700 of memory 22. The send engine 300 causes this item of data to be sent via the loopback path. The receive engine 320 causes this item of data to be stored in the second logical position in the portion of memory 1710.

Following the sending of the second item of data, the send engine 300 causes the third item of data to be sent. This item is also non-contiguous with the previous item and is the seventh in the logical sequence of items in memory portion 1700. The receive engine 320 causes this item of data to be stored in the third position in the portion 1710 of memory 22.

The send engine 300 continues sending data from the memory portion 1700 in the order shown. The fourth item of data sent is the second in the logical sequence in portion 1700 of memory 22, and the fifth item of data sent is the fifth in the logical sequence in portion 1700 of memory 22. For simplicity, FIG. 17 only illustrates the first five accesses to portion 1700 of memory 22. However, the send engine 300 continues accessing items of data in memory 22 according to the sequence: [1, 4, 7, 2, 5, 8, 3, 6, 9]. Since the receive engine 320 in this example is configured to store data in memory 22 in the sequence in which that data is received from the send engine 300, the result is that the logical arrangement in memory portion 1710 matches the order in which data is sent by the send engine 300.

The order in which the data items are sent by the send engine 300 is determined, at least in part, by a variable stride pattern implemented by the send engine 300 as described above with respect to FIGS. 3 to 11. Specifically, when implementing such a variable stride pattern, the send engine 300 accesses each of the data items held in memory portion 1700 at a position identified by its read pointer and updates its read pointer between each send of an item of data. For example, the access pattern applied to the portion 1700 of memory 22 that is used to send the data items in the order described may be achieved by using the outgoing configuration values shown in table 2 below.

TABLE 2

| | |
|---|---|
| Inner repeat value | 0 |
| Mezzo stride size | +3 |
| Mezzo repeat value | 2 |
| Outer stride size | −5 |

By repeatedly performing two strides, given by +3, and a single stride, given by −5, the send engine 300 accesses the locations in memory portion 1700 in the order in which the items of data are to be arranged in memory portion 1710. The send engine 300 causes these items to be sent. Given the current selection of the loopback path, these items of data are sent via the loopback path towards the memory 22. The receive engine 320 causes these items of data to be stored in the same order in which they are sent via the sent engine 300 along the loopback path. This may be implemented by the receive engine 320 also applying a variable stride pattern, where the incoming configuration values for that stride pattern are such that the inner repeat value is set to a non-zero value (e.g. 1), whilst the other configuration values are set to zero. The receive engine 320 stores each of the items received via the loopback path at locations in the memory portion 1710 identified by its write pointer, and updates its write pointer by +1.

In some embodiments, rather than relying entirely upon the variable stride functionality to determine the addresses from which all of the items of data is to be sent, each of some of the items sent from the memory portion 1700 may be sent in response to execution of a separate SEND instruction (e.g. SEND instruction 900) by the execution unit 18, where each such SEND instruction specifies the address of the first item of data in the memory 22 that is to be sent in response to its execution.

Reference is made to FIG. 18, which illustrates an example in which the receive engine 320 is used to implement the re-arrangement of items of data held in the memory portion 1700. In this case, the send engine 300 sends each of the items of data from the memory portion 1700 in an order which matches the logical arrangement in which they are stored in the memory portion 1700. However, the receive engine 320 causes the items of data to be stored in memory portion 1710 in a new arrangement that does not match the previous logical arrangement of the data items in memory portion 1700.

The send engine causes 300 the first item (labelled 1) in the first position in the memory portion 1700 to be sent via the loopback path to the receive engine 320. The receive engine 320, upon receiving this first item, causes the item to be stored at the first position in the memory portion 1710.

The send engine 300 causes the second item (labelled 2) in the second position in the memory portion 1700 to be sent via the loopback path to the receive engine 320. The receive engine 320, upon receiving this second item, causes the item to be stored at the fourth position in the memory portion 1710.

The send engine 300 continues sending items according to their contiguous arrangement in memory portion 1700. The receive engine 320 causes the items to be stored in the memory portion 1710 by applying the pattern of access shown in FIG. 18. This pattern of access mirrors the pattern of access applied by the send engine 300 in the example shown in FIG. 17.

The arrangement in which data items are stored in memory portion 1710 by the receive engine 320 is determined by a variable stride pattern implemented by the receive engine 320 as described above with respect to FIGS.

3 to 10. Specifically, the receive engine 320 stores each of the data items in memory portion 1710 at positions identified by its write pointer and updates its write pointer between each store of an item of data. For example, the access pattern applied to the portion 1710 of memory 22 that is used to send the data items in the order described may be achieved by using the incoming configuration values shown in table 3 below.

TABLE 3

| Inner repeat value | 0 |
|---|---|
| Mezzo stride size | +3 |
| Mezzo repeat value | 2 |
| Outer stride size | −5 |

By repeatedly performing two strides—each of size +3—and a single stride—given by −5—the receive engine 320 accesses the locations in memory portion 1710 to store the items of data in the order shown in FIG. 18. This arrangement of memory items represents the transposed form 1610 of the matrix 1600.

In this example, the sending by the send engine 300 may be performed by applying a variable stride pattern for which the inner repeat value is set to a non-zero value (e.g. 1), whilst the other configuration values are set to zero. The send engine 300 causes each of the items in its memory portion 1700 to be sent via the loopback path from locations in the memory portion 1700 identified by its read pointer. The send engine 300 updates its read pointer between each send. The receive engine 320 stores each of the items received via the loopback path at locations in the memory portion 1710 identified by its write pointer, and updates its write pointer in accordance with the incoming configuration values shown in table 3.

In some embodiments, rather than relying entirely upon the variable stride functionality to determine the addresses for storing all of the items of data, each of some of the items stored in memory portion 1710 may be stored at locations determined by the execution of separate memory pointer update instructions (e.g. memory pointer update instruction 1100) by the execution unit 18, where each such memory pointer update instruction specified the address of the location in the memory 22 to which the next item of data received via the loopback path is to be stored.

An example of one type of operation (i.e. matrix transpose) requiring a re-arrangement of data has been described with respect to FIGS. 16 to 18. However, the same principles are applicable to other types of transformation that may be applied. Furthermore, these examples have described cases where the re-arrangement is performed using either out of order sending (described with respect to FIG. 17) or out of order storing (described with respect to FIG. 18). However, in some cases, some re-arrangements may be applied by performing both out of order sending and out of order storing.

The send functionality used to access data and send that data via the loopback path or to an external processing device has been described as being implemented in the send engine 300. Likewise, the receive functionality used to access memory locations and store received data to those memory locations has been described as being implemented in the receive engine 320. However, it is not required for the send and receive functionality to be implemented in physically separate blocks. The operations implemented by the send engine 300 and the receive engine 320 may be described as being implemented at a generic level by circuitry of the processing device 40.

The description above has described three different forms of SEND instruction (i.e. SEND instruction 900, 900a, 1000) that may be executed by the execution unit. Unless otherwise stated, the teaching herein with regard to "SEND instructions" may be understood to apply to any of these three instructions and may, additionally, apply to other types of SEND instruction.

The time deterministic communication between tiles 4 is described in more detail in earlier U.S. application Ser. No. 15/886,131, which is incorporated by reference.

Figure 13:
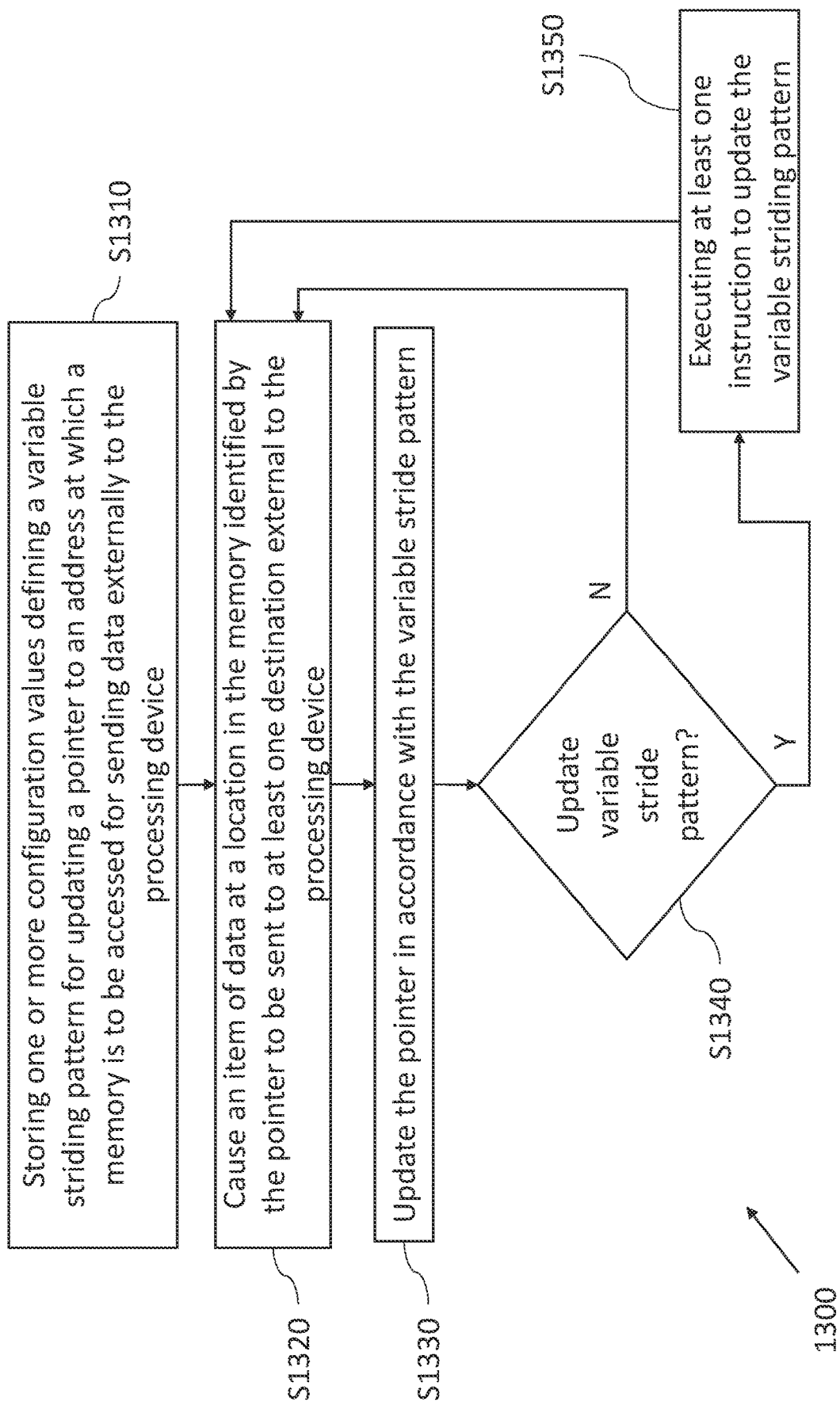
FIG. 13 is a flow chart for a method for sending data from a processing device.

Reference is made to FIG. 13, which illustrates a method 1300 for sending data according to embodiments of the application.

At S1310, one or more configuration values defining a variable stride pattern are set up in the send engine. These values may be initial values set up by execution of one or more put instructions by the at least one execution unit, prior to sends being performed.

At S1320, in response to execution of a SEND instruction, the send engine causes an item of data at a location in the memory identified by the pointer to be sent to at least one destination external to the processing device.

At S1330, after sending the item of data, the send engine updates the pointer in accordance with the variable stride pattern.

At S1340, if the execution unit reaches a point in the compiled code at which the variable stride pattern is to be updated, the method 1300 proceeds to S1350. Otherwise, the method 1300 proceeds to S1320 at which a further item of data is sent.

At S1350, an instruction is executed to update the variable stride pattern. The method 1300 then proceeds to S1320 at which a further item of data is sent and S1330 at which the pointer is updated in accordance with the new variable stride pattern.

Figure 14:
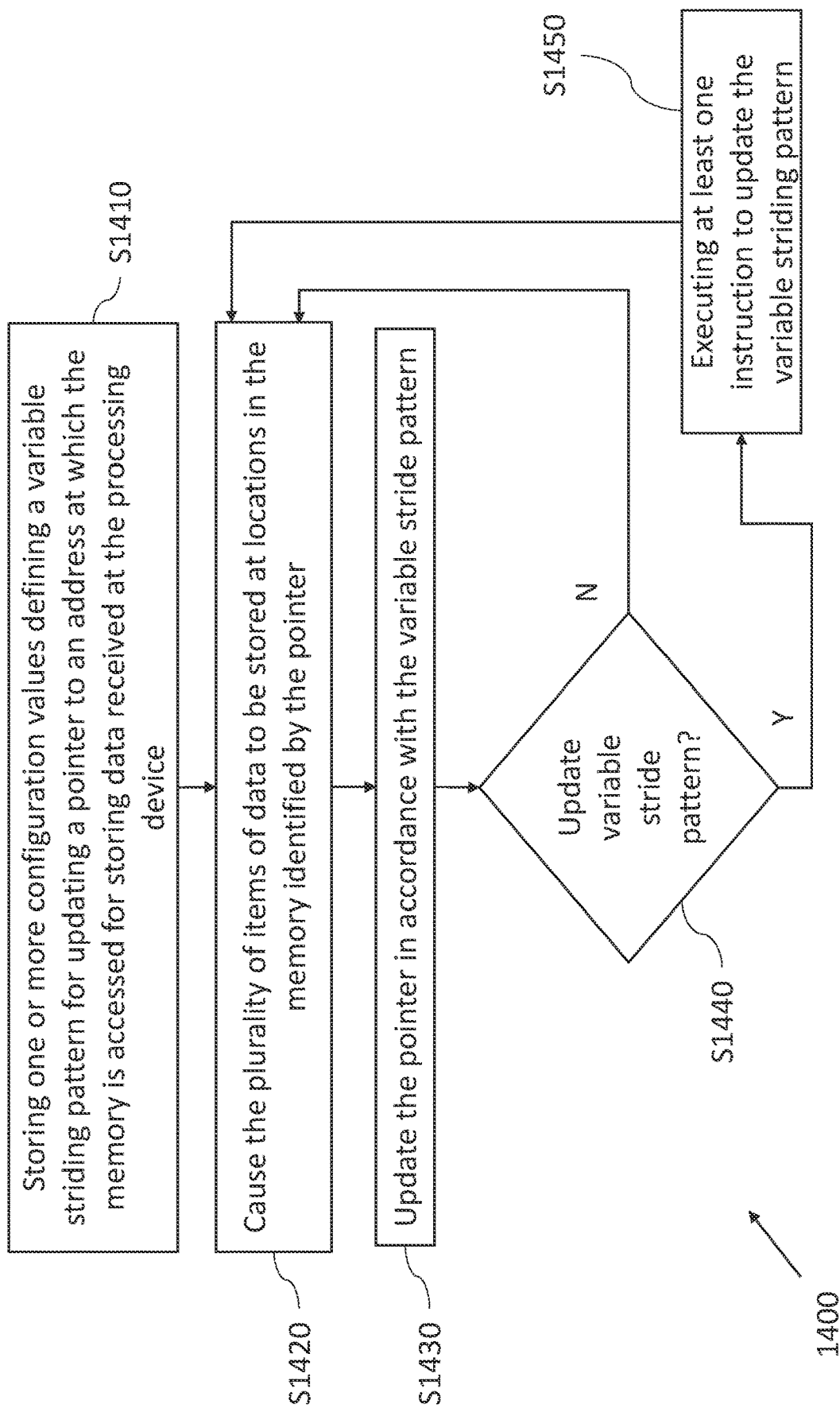
FIG. 14 is a flow chart for a method for receiving data from a processing device.

Reference is made to FIG. 14, which illustrates a method 1400 for receiving data according to embodiments of the application.

At S1410, one or more configuration values defining a variable stride pattern are set up in the receive engine. These values may be initial values set up by execution of one or more put instructions by the at least one execution unit, prior to data items being received.

At S1420, in response to receipt of an item of data at the processing device (e.g. tile 4), the receive engine causes the item of data to be stored at a location in the memory identified by the pointer.

At S1430, after storing the item of data, the receive engine updates the pointer in accordance with the variable stride pattern.

At S1440, if the execution unit reaches a point in its compiled code which the variable stride pattern is to be updated, the method 1400 proceeds to S1450.

At S1450, an instruction is executed to update the variable stride pattern. The method then proceeds to S1420 at which a further item of data is received and stored in the memory in accordance with the updated variable stride pattern.

Figure 19:
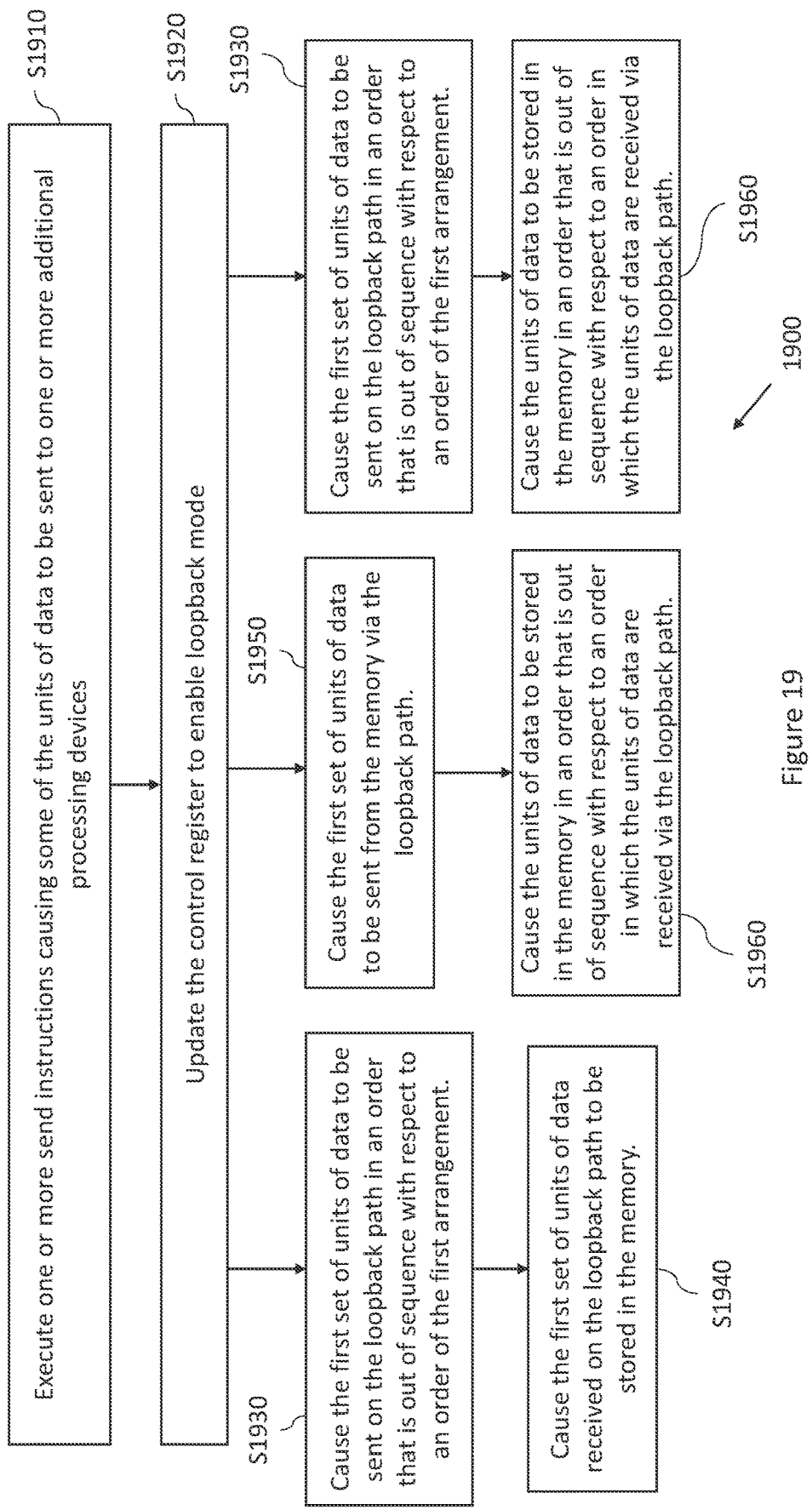
FIG. 19 is a flow chart for a method for re-arranging data by sending that data via the loopback path.

Reference is made to FIG. 19, which illustrates an example of a method 1900 for re-arranging data. The method 1900 includes steps of sending data over the output interface 310 to additional processing devices. Prior to the first step in the method 1900, the control register 120 stores an indication that the loopback mode is disabled.

At S1910, the execution unit 18 executes one or more send instructions to cause at least some of the units of data held in memory 22 to be sent over the output interface 310 to the one or more additional processing devices.

At S1920, the execution unit 18 executes an instruction to cause the loopback mode to be enabled.

This step involves writing an indication that loopback mode is enabled to the control register 120.

The method 1900 then comprises steps performed to cause re-arrangement of a first set of data units held in the memory 22. This first set of data units may be the data units (labelled 1 to 9) held in the memory portion 1700 shown in FIGS. 17 and 18. The method 1900 shows three separate branches, each of which represents a different way in which the re-arrangement of the items of data may be performed. A first branch is represented by the combination of S1930 and S1940 and shows one way in which the re-arrangement may be achieved based on out of order sending. The first branch may be applied to perform the re-arrangement represented in FIG. 17. A second branch, represented by the combination of S1950 and S1960, shows another way in which the re-arrangement may be achieved based on out of order storing. The second branch may be applied to perform the re-arrangement represented in FIG. 18. A third branch, represented by the combination of S1930 and S1960, shows another way in which the re-arrangement may be achieved based on both out of order sending and out of order storing. Each of the three branches includes sending the first set of data units from the memory 22 along a loopback path so as to return and store the first set of data units back in the memory 22.

At S1930, circuitry of the processing device 40 causes the first set of units of data to be sent on the loopback path in an order that is out of sequence with respect to an order of the first arrangement in which the first set of units of data is held in the memory 22. This step is performed in response to the execution unit 18 executing one or more send instructions. The circuitry that implements S1930 comprises the execution unit 18 and circuitry of the send engine 300.

At S1940, circuitry of the processing device 40 causes the first set of data units that were sent over the loopback path in S1930 to be stored in the memory 22. The circuitry causes each of the first set of data units to be stored in the memory 22 in the order in which they were sent in S1930. The circuitry that implements S1940 comprises circuitry of the receive engine 320.

At S1950, circuitry of the processing device 40 causes the first set of units of data to be sent on the loopback path in an order that matches the first arrangement in which the first set of units of data is held in the memory 22. This step is performed in response to the execution unit 18 executing one or more send instructions. The circuitry that implements S1930 comprises the execution unit 18 and circuitry of the send engine 300.

At S1960, circuitry of the processing device 40 causes the first set of data units that were sent over the loopback path in S1950 to be stored in the memory 22. The circuitry causes each of the first set of data units to be stored in the memory 22 in an order that is out of sequence with respect to the order in which the units of data were sent at S1950. In embodiments, the circuitry that implements S1960 comprises circuitry of the receive engine 320 and, optionally, the execution unit 18.

It would be appreciated that the embodiments have been described by way of example only.

The invention claimed is:

1. A processing device configured to execute an application in conjunction with an external processing device, comprising:
a memory;
an execution unit configured to execute a send instruction to send application data to the external processing device;
a send engine comprising:
one or more registers for storing one or more configuration values defining a variable stride pattern for updating a pointer to an address at which the memory is to be accessed for sending the application data to the external processing device; and
processing circuitry configured to, in response to execution of one or more instances of the send instruction by the execution unit:
cause a plurality of items of the application data at locations in the memory identified by the pointer to be sent to the external processing device; and
between each send of one of the plurality of items of the application data, update the pointer in accordance with the variable stride pattern,
wherein the execution unit is configured to execute at least one instruction to update the variable stride pattern used by the send engine, wherein updating the variable stride pattern comprises updating at least one of the one or more configuration values to one or more new values for use by the send engine in performing one or more subsequent sends in response to a further instance of the send instruction executed by the execution unit.

2. The processing device of claim 1, wherein the at least one instruction comprises an instruction having a combined send and update functionality, which when executed by the execution unit causes both:
the new values for the at least one of the one or more configuration values to be provided to the send engine for use by the send engine in performing the one or more subsequent sends; and
sending of a further item of data from the memory.

3. The processing device of claim 1, wherein the at least one instruction, when executed by the execution unit, causes the new values for the at least one of the one or more of the configuration values to be copied to part of the one or more registers whilst the send engine continues to update the pointer using former values for the at least one of the one or more configuration values.

4. The processing device of claim 3, wherein the execution unit is configured to, following the copying of the new values to the part of the one or more registers, cause the new values to replace the former values for use by the send engine.

5. The processing device of claim 1, wherein the at least one of the one or more configuration values include at least one of:
a stride size value defining a separation in the memory between two of the items of application data to be sent consecutively by the send engine; and
a repeat value defining a number of times a stride of a particular size is to be applied by the send engine before applying a stride of a different size.

6. The processing device of claim 1, wherein the memory is configured to store a compiled code set comprising the one or more instances of the send instruction and one or more instances of the at least one instruction for updating the variable stride pattern,
wherein the compiled code set is arranged such that each of the one or more instances of the send instruction is executed during an allocated clock cycle that is a predefined number of processor clock cycles following receipt of the synchronisation signal, wherein the compiled code set is arranged such that each of the one or more instances of the at least one instruction for updating the variable stride pattern is executed during an allocated clock cycle that is a predefined number of processor clock cycles following receipt of the synchronisation signal.

7. The processing device of claim 1, wherein the processing device comprises wiring configured to transport further data from the memory along a loopback path to be stored back in the memory, wherein the processing circuitry of the send engine is configured to, in response to execution of an additional one or more instances of the send instruction by the execution unit:

cause a plurality of items of the further data to be re-arranged in the memory by sending the plurality of items of the further data via the loopback path in an order determined by a current variable stride pattern active for the send engine.

8. A processing device configured to execute an application in conjunction with an external processing device, comprising:

a memory;

an execution unit; and a receive engine comprising:

one or more registers for storing one or more configuration values defining a variable stride pattern for updating a pointer to an address at which the memory is accessed for storing application data received at the processing device from the external processing device; and processing circuitry configured to, in response to receipt of a plurality of items of application data at the processing device:

cause the plurality of items of application data to be stored at locations in the memory identified by the pointer; and for each receipt and storage of one of the plurality of items of application data, update the pointer in accordance with the variable stride pattern, wherein the execution unit is configured to execute at least one instruction to update the variable stride pattern used by the receive engine, wherein updating the variable stride pattern comprises updating at least one of the one or more configuration values to one or more new values to be used by the receive engine for storing one or more further items of application data received at the processing device.

9. The processing device of claim 8, wherein the at least one instruction comprises an instruction having a combined send and update functionality, which when executed by the execution unit causes both:

the new values for the at least one of the one or more of the configuration values to be provided to the receive engine for use by the receive engine in storing the one or more further items of data; and sending of an outgoing item of data from the memory.

10. The processing device of claim 8, wherein the at least one instruction, when executed by the execution unit, causes the new values for the at least one of the one or more configuration values to be copied to part of the one or more registers whilst the receive engine continues to update the pointer using former values for the at least one of the one or more configuration values.

11. The processing device of claim 10, wherein the execution unit is configured to, following the copying of the new values to the part of the one or more registers, cause the new values to replace the former values for use by the receive engine.

12. The processing device of claim 8, wherein the at least one of the one or more configuration values include at least one of:

a stride size value defining a separation in the memory between locations in the memory to which data items are stored consecutively by the receive engine; and a repeat value defining a number of times a stride of a particular size is to be applied by the receive engine before applying a stride of a different size.

13. The processing device of claim 8, wherein the memory is configured to store a compiled code set comprising one or more instances of the at least one instruction for updating the variable stride pattern, wherein the compiled code set is arranged such that each of the one or more instances of the at least one instruction is executed by the execution unit during an allocated clock cycle that is a predefined number of processor clock cycles following receipt of a synchronisation signal at the processing device.

14. The processing device of claim 8, wherein the processing device comprises wiring configured to transport further data from the memory along a loopback path to be stored back in the memory, wherein the processing circuitry of the receive engine is configured to, cause a plurality of items of the further data to be re-arranged in the memory by, in response to receipt of the plurality of items of the further data via the loopback path:

storing the plurality of items of the further data in an arrangement dependent upon a current variable stride patterns active for the receive engine.

15. The processing device of claim 1, wherein the at least one of the one or more configuration values includes a plurality of configuration values, wherein the execution unit is configured to, upon executing the at least one instruction, update a bit string held in a configuration register of the processing device, wherein the bit string held in the configuration register is divided into a plurality of subsets of bits each of which is mapped to one of the plurality of configuration values such that the processing circuitry is configured to:

use updated values for those ones of the plurality of configuration values to which the subsets are mapped in response to the write of the bit string to the configuration register.

16. A method for sending application data from a processing device to an external processing device to execute an application in conjunction with the external processing device, the method comprising:

storing one or more configuration values defining a variable stride pattern for updating a pointer to an address at which a memory is to be accessed for sending application data to the external processing device; and in response to execution of one or more instances of a send instruction:

cause a plurality of items of application data at locations in the memory identified by the pointer to be sent to the external processing device; and between each send of one of the plurality of items of application data, update the pointer in accordance with the variable stride pattern, wherein the method further comprises executing at least one instruction to update the variable stride pattern, wherein updating the variable stride pattern comprises updating at least one of the one or more configuration values to one or more new values for use in performing one or more subsequent sends in response to execution of a further instance of the send instruction.

17. A method for storing application data received at a processing device from an external processing device during execution of an application involving the processing device and the external processing device, the method comprising:
   storing one or more configuration values defining a variable stride pattern for updating a pointer to an address at which a memory is accessed for storing application data received at the processing device from the external processing device; and
   in response to receipt of a plurality of items of application data at the processing device:
      cause the plurality of items of application data to be stored at locations in the memory identified by the pointer; and
      for each receipt and storage of one of the plurality of items of application data, update the pointer in accordance with the variable stride pattern,
   wherein the method further comprises executing at least one instruction to update the variable stride pattern, wherein updating the variable stride pattern comprises updating at least one of the one or more configuration values to one or more new values to be used for storing one or more further items of application data received at the processing device.

18. A non-transitory computer readable medium storing a set of computer readable instructions, which when executed by an execution unit of a processing device, cause a method for sending application data from the processing device to an external processing device to be performed to execute an application in conjunction with the external processing device, the method comprising:
   storing a configuration value defining a variable stride pattern for updating a pointer to an address at which a memory is to be accessed for sending application data to the external processing device;
   in response to execution of a send instruction:
      causing a first application data item and a second application data item, at locations in the memory identified by the pointer, to be sent to the external processing device; and
      between the first application data item being sent and the second application data item being sent, updating the pointer in accordance with the variable stride pattern; and
   updating the variable stride pattern in response to execution of an instruction to update the variable stride pattern, including updating the configuration value to a new value.

19. A non-transitory computer readable storage medium storing a set of computer readable instructions, which when executed by an execution unit of a processing device, cause a method for storing application data received at the processing device from an external processing device during execution of an application involving the processing device and the external processing device, to be performed, the method comprising:
   storing a configuration value defining a variable stride pattern for updating a pointer to an address at which a memory is accessed for storing application data received at the processing device from the external processing device;
   in response to receipt of a first application data item and a second application data item at the processing device:
      cause the first application data item and the second application data item to be stored at locations in the memory identified by the pointer; and
      update the pointer in accordance with the variable stride pattern between storing the first application data item and storing the second application data item; and
   updating the variable stride pattern in response to the execution of an instruction to update the variable stride pattern, including updating the configuration value.

\* \* \* \* \*